US009870715B2

(12) United States Patent
Sadeh-Koniecpol et al.

(10) Patent No.: US 9,870,715 B2
(45) Date of Patent: *Jan. 16, 2018

(54) CONTEXT-AWARE CYBERSECURITY TRAINING SYSTEMS, APPARATUSES, AND METHODS

(71) Applicant: Wombat Security Technologies, Inc., Pittsburgh, PA (US)

(72) Inventors: Norman Sadeh-Koniecpol, Pittsburgh, PA (US); Kurt Wescoe, Pittsburgh, PA (US); Jason Brubaker, Mechanicsburg, PA (US); Jason Hong, Pittsburgh, PA (US)

(73) Assignee: WOMBAT SECURITY TECHNOLOGIES, INC., Pittsburgh, PA (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/418,867

(22) Filed: Jan. 30, 2017

(65) Prior Publication Data

US 2017/0140663 A1    May 18, 2017

Related U.S. Application Data

(63) Continuation of application No. 14/216,002, filed on Mar. 17, 2014, now Pat. No. 9,558,677, and a (Continued)

(51) Int. Cl.
*G09B 19/00* (2006.01)
*H04L 29/06* (2006.01)
(Continued)

(52) U.S. Cl.
CPC ............. *G09B 19/00* (2013.01); *A63F 13/80* (2014.09); *G06F 21/55* (2013.01); *G06F 21/552* (2013.01);
(Continued)

(58) Field of Classification Search
CPC ............. H04L 63/145; H04L 63/1408; H04L 63/1416; H04L 63/1425; H04L 63/1433;
(Continued)

(56) References Cited

U.S. PATENT DOCUMENTS 6,324,647 B1    11/2001  Bowman-Amuah
6,634,887 B1    10/2003  Heffernan, III et al.
(Continued)

OTHER PUBLICATIONS

Ponnurangam Kumaraguru, et al. Protecting people from phishing: the design and evaluation of an embedded training email system. Published in CHI '07 Proceedings of the SIGCHI Conference on Human Factors in Computing Systems pp. 905-914 San Jose, California, USA—Apr. 28-May 3, 2007 ACM New York, NY, USA © 2007 <doi>10.1145/1240624.1240760>.*
(Continued)

*Primary Examiner* — Nikolai A Gishnock
(74) *Attorney, Agent, or Firm* — Fox Rothschild LLP

(57) ABSTRACT

A system assesses the susceptibility of an electronic device user to a cybersecurity threat by sensing a user action with respect to the electronic device. The system maps the sensed data to a training needs model to determine whether the sensed data corresponds to a pattern associated with a threat scenario in the training needs model. When the system determines that the sensed data corresponds to a pattern associated with a threat scenario in the training needs model, identify a cybersecurity threat scenario for which the user is at risk, and use the training needs model to estimate susceptibility of the user to the cybersecurity threat scenario.

30 Claims, 14 Drawing Sheets

Related U.S. Application Data continuation-in-part of application No. 13/442,587, filed on Apr. 9, 2012, now Pat. No. 9,547,998, said application No. 14/216,002 is a continuation-in-part of application No. 13/832,070, filed on Mar. 15, 2013, now Pat. No. 9,280,911, which is a continuation of application No. 13/442,587, filed on Apr. 9, 2012, now Pat. No. 9,547,998.

(60) Provisional application No. 61/793,011, filed on Mar. 15, 2013, provisional application No. 61/473,366, filed on Apr. 8, 2011, provisional application No. 61/473,384, filed on Apr. 8, 2011.

(51) Int. Cl.
*G06F 21/56* (2013.01)
*G06F 21/55* (2013.01)
*G09B 5/00* (2006.01)
*A63F 13/80* (2014.01)
*G09B 5/06* (2006.01)

(52) U.S. Cl.
CPC ............ *G06F 21/554* (2013.01); *G06F 21/56* (2013.01); *G06F 21/562* (2013.01); *G06F 21/563* (2013.01); *G06F 21/564* (2013.01); *G06F 21/565* (2013.01); *G06F 21/566* (2013.01); *G06F 21/567* (2013.01); *G09B 5/00* (2013.01); *G09B 5/065* (2013.01); *G09B 19/0053* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/1475* (2013.01); *H04L 63/1483* (2013.01); *H04L 63/1491* (2013.01)

(58) Field of Classification Search
CPC ............ H04L 63/1441; H04L 63/1458; H04L 63/1466; H04L 63/1475; H04L 63/1483; H04L 63/1491; G06F 21/55; G06F 21/56; G06F 21/552; G06F 21/554; G06F 21/562; G06F 21/563; G06F 21/564; G06F 21/565; G06F 21/566; G06F 21/567
USPC .......................................... 726/11, 22, 23, 26
See application file for complete search history.

(56) References Cited

U.S. PATENT DOCUMENTS

| | | |
|---|---|---|
| 6,954,858 B1 | 10/2005 | Welborn et al. |
| 7,092,861 B1 | 8/2006 | Shteyn |
| 7,325,252 B2 | 1/2008 | Bunker, V et al. |
| 7,457,823 B2 | 11/2008 | Shraim et al. |
| 7,486,666 B2 | 2/2009 | Meyer |
| 7,761,618 B2 | 7/2010 | Avraham et al. |
| 8,046,374 B1 | 10/2011 | Bromwich |
| 8,063,765 B2 | 11/2011 | Johnson et al. |
| 8,146,164 B2 | 3/2012 | Eshun et al. |
| 8,205,255 B2 | 6/2012 | Benea et al. |
| 8,220,047 B1 | 7/2012 | Soghoian et al. |
| 8,255,393 B1 | 8/2012 | Yu et al. |
| 8,266,320 B1 | 9/2012 | Bell et al. |
| 8,321,945 B2 | 11/2012 | Nakagawa |
| 8,341,691 B2 | 12/2012 | Bezilla et al. |
| 8,402,528 B1 | 3/2013 | McCorkendale et al. |
| 8,423,483 B2 | 4/2013 | Sadeh-Koniecpol et al. |
| 8,448,245 B2* | 5/2013 | Banerjee ............... G06F 21/51 709/224 |
| 8,457,594 B2 | 6/2013 | Stevens et al. |
| 8,464,346 B2* | 6/2013 | Barai ............... H04L 63/1433 380/200 |
| 8,468,244 B2 | 6/2013 | Redlich et al. |
| 8,468,279 B2 | 6/2013 | Khosravi et al. |
| 8,478,860 B2 | 7/2013 | Roberts et al. |
| 8,495,700 B2 | 7/2013 | Shahbazi |
| 8,532,970 B2 | 9/2013 | White et al. |
| 8,533,847 B2 | 9/2013 | Kedem |
| 8,560,709 B1 | 10/2013 | Shokhor et al. |
| 8,560,864 B2 | 10/2013 | Chang et al. |
| 8,561,134 B2 | 10/2013 | Bezilla et al. |
| 8,608,487 B2 | 12/2013 | Huie et al. |
| 8,615,807 B1 | 12/2013 | Higbee et al. |
| 8,635,703 B1 | 1/2014 | Belani et al. |
| 8,646,028 B2 | 2/2014 | McKenzie et al. |
| 8,656,095 B2 | 2/2014 | Coulter |
| 8,683,588 B2 | 3/2014 | Esteban et al. |
| 8,707,180 B2 | 4/2014 | Butler et al. |
| 8,719,925 B1 | 5/2014 | Berg |
| 8,719,940 B1 | 5/2014 | Higbee et al. |
| 8,751,629 B2 | 6/2014 | White et al. |
| 8,763,126 B2 | 6/2014 | Wang et al. |
| 8,769,684 B2 | 7/2014 | Stolfo et al. |
| 8,776,170 B2 | 7/2014 | Bezilla et al. |
| 8,782,745 B2 | 7/2014 | Stevens et al. |
| 8,793,795 B1 | 7/2014 | Ravid |
| 8,793,799 B2 | 7/2014 | Fritzson et al. |
| 8,819,825 B2 | 8/2014 | Keromytis et al. |
| 8,819,858 B2 | 8/2014 | Mandava |
| 8,910,287 B1 | 12/2014 | Belani et al. |
| 8,914,846 B2 | 12/2014 | Bezilla et al. |
| 8,918,872 B2 | 12/2014 | Kumar et al. |
| 8,931,101 B2 | 1/2015 | Baluda et al. |
| 8,943,554 B2 | 1/2015 | Tran et al. |
| 8,955,109 B1 † | 2/2015 | Satish |
| 8,966,637 B2 | 2/2015 | Belani et al. |
| 8,978,151 B1 | 3/2015 | Chamberlain |
| 9,009,835 B2 | 4/2015 | Yoo |
| 9,015,789 B2 | 4/2015 | Thomas |
| 9,027,134 B2 | 5/2015 | Foster et al. |
| 9,031,536 B2 | 5/2015 | Fitzgerald et al. |
| 9,069,961 B2 | 6/2015 | Khosravi et al. |
| 9,076,132 B2* | 7/2015 | Golan ............... G06Q 10/107 |
| 9,118,665 B2 | 8/2015 | Krahn et al. |
| 9,141,792 B2 | 9/2015 | Baluda et al. |
| 9,154,523 B2 | 10/2015 | Bezilla et al. |
| 9,215,250 B2 | 12/2015 | Porten et al. |
| 9,280,911 B2 | 3/2016 | Sadeh-Koniecpol et al. |
| 9,330,257 B2 | 5/2016 | Valencia et al. |
| 9,367,484 B2 | 6/2016 | Hogan et al. |
| 9,392,024 B2 | 7/2016 | Bezilla et al. |
| 9,426,179 B2 | 8/2016 | Keene et al. |
| 2002/0066028 A1 † | 5/2002 | Welborn |
| 2002/0091940 A1 | 7/2002 | Welborn et al. |
| 2004/0107345 A1 | 6/2004 | Brandt et al. |
| 2005/0183143 A1 | 8/2005 | Anderholm et al. |
| 2006/0037076 A1 | 2/2006 | Roy |
| 2006/0075024 A1 | 4/2006 | Zircher et al. |
| 2006/0253906 A1 | 11/2006 | Rubin et al. |
| 2007/0112714 A1 | 5/2007 | Fairweather |
| 2007/0180525 A1 | 8/2007 | Bagnall |
| 2007/0226796 A1 | 9/2007 | Gilbert et al. |
| 2007/0245422 A1 | 10/2007 | Hwang et al. |
| 2007/0271613 A1 | 11/2007 | Joyce |
| 2008/0052359 A1 | 2/2008 | Golan et al. |
| 2008/0167920 A1 | 7/2008 | Schmidt et al. |
| 2008/0222734 A1 | 9/2008 | Redlich et al. |
| 2008/0244715 A1* | 10/2008 | Pedone ............... H04L 63/1441 726/5 |
| 2008/0254419 A1 † | 10/2008 | Cohen |
| 2008/0288330 A1 | 11/2008 | Hildebrand et al. |
| 2009/0144308 A1 | 6/2009 | Huie et al. |
| 2009/0158430 A1 | 6/2009 | Borders |
| 2009/0319906 A1 † | 12/2009 | White |
| 2009/0320137 A1 | 12/2009 | White et al. |
| 2010/0010968 A1 | 1/2010 | Redlich et al. |
| 2010/0146615 A1 | 6/2010 | Locasto |
| 2010/0235918 A1 | 9/2010 | Mizrahi et al. |
| 2011/0167011 A1 | 7/2011 | Paltenghe et al. |

(56) References Cited

U.S. PATENT DOCUMENTS

| | | |
|---|---|---|
| 2011/0238855 A1 | 9/2011 | Korsunsky et al. |
| 2012/0124671 A1 | 5/2012 | Fritzson et al. |
| 2012/0258437 A1 | 10/2012 | Sadeh-Koniecpol et al. |
| 2013/0232576 A1 | 9/2013 | Kamikis et al. |
| 2014/0115706 A1 | 4/2014 | Silva et al. |
| 2014/0157405 A1 | 6/2014 | Joll et al. |
| 2014/0165207 A1 | 6/2014 | Engel et al. |
| 2014/0199663 A1 | 7/2014 | Sadeh-Koniecpol et al. |
| 2014/0199664 A1 | 7/2014 | Sadeh-Koniecpol et al. |
| 2014/0201836 A1 | 7/2014 | Amsler |

OTHER PUBLICATIONS

An Empirical Evaluation of PhishGuru Embedded Training, printed publication http://wombatsecurity.com/file_download/1/pgwhitepaperC.pdf, 12 pages, Apr. 3, 2009, retrieved from Internet Archive Wayback Machine https://web.archive.Org/web/20090403084328/http:// wombatsecurity.com/file_download/1/pg-whitepaperC.pdf on Jul. 21, 2017.*

Kumaraguru et al., "Protecting People from Phishing: The Design and Evaluation of an Embedded Training Email System", 2007, In Proceedings of the SIGCHI Conference on Human Factors in Computing Systems.

Kumaraguru et al., "Testing PhishGuru in the Real World", In Proceedings of the 2008 Symposium on Usable Privacy and Security (SOUPS 2008).

Kumaraguru, et al., "Lessons From a Real World Evaluation of Anti-Phishing Training", 2008 Anti-Phishing Working Group e-Crime Researchers Summit.

Sheng, et al., "Anti-Phishing Phil: The Design and Evaluation of a Game That Teaches People Not to Fall for Phish", Symposium on Usable Privacy and Security (SOUPS) 2007, Jul. 18-20, 2007, Pittsburgh, PA, USA.

Mitrovic, et al., "Evaluation of a Constraint-Based Tutor for a Database Language", International Journal of Artificial Intelligence in Education (1999), 10, 238-256.

Anderson et al., "A Development System for Model-Tracing Tutors", Nov. 18, 2008, Department of Psychology, Paper 78, Carnegie Mellon University Research Showcase.

Fette et al., "Learning to Detect Phishing Emails", World Wide Web Conference Committee, May 8-12, 2007, Banff, Alberta, Canada.

Jagaric et al., "Social Phishing" ACM (Dec. 12, 2005).

Scheeres, Thesis: "Establishing the Human Firewall: Reducing an Individual's Vulnerability to Social Engineering," presented to Air Force Institute of Technology, Mar. 2008.

Vishwanath et al., "Why Do People Get Phished? Testing Individual Differences in Phishing Vulnerability with an Integrated, Information Processing Model." Mar. 3, 2011.

Ferguson, "Fostering E-Mail Security Awareness: The West Point Caronnade," published in Educause Quarterly Nov. 1, 2005.

Information about Related Patents and Patent Applications, see section 6 of the accompanying Information Disclosure Statement Letter, which concerns Related Patents and Patent Applications.

An Empirical Evaluation of PhishGuru Embedded Training, printed publication http://wombatsecurity.com/file_download/1/pgwhitepaperC.pdf, 12 pages, Apr. 3, 2009, retrieved from Internet Archive Wayback Machine https://web.archive.org/web/20090403084328/http://wombatsecurity.com/file_download/1/pg-whitepaperC.pdf on Jul. 7, 2017.†

\* cited by examiner
† cited by third party

Sample Training Needs Model with Threshold Levels

| 2020 Threat Scenarios | 2030 Sensed User Action | 3010 Threshold Level | 3020 Training Needs |
|---|---|---|---|
| Download malware from malicious USB | Insert USB in computing device | More than once per month | Malware (High), Safe Browsing (Medium) |
| Download malicious app | Download fake malicious app by scanning a QR code | Once | Malware (High), Safe Browsing (Medium) |
| Connect to rogue wireless service | Connect to unsecured or out of office access point | More than once per week | Network security (High), Safe Browsing (Medium) |
| SMS mock attack | Call fake malicious phone number in mock SMS attack | Once | Messaging (High), Smart Phone Security (Medium) |
| Bluesnarfing | User carries bluetooth discoverable device | Once | Messaging (High), Smart Phone Security (High) |

FIG. 4

Sample Elements of Quantitative Training Needs Model Based on Risk Estimates

| 4010 Threat Scenario | Cost Per Incident |
|---|---|
| Open a Malicious Attachment | $1,000 |
| Infect Computer with a Virus | $500 |
| Disclose Personal Information | $10,000 |
| Fall for Phishing Email | $4,500 |

| Threat Scenarios | Sensed User Action | Frequency Thresholds | 24 Hour Susceptibility (Untrained) | 1 Week Susceptibility (Untrained) | 24 Hour Risk (Untrained) | 1 Week Risk (Untrained) |
|---|---|---|---|---|---|---|
| Open a Malicious Attachment | Request Blacklisted Website | Less than once per month | 0.001 | 0.005 | $1.0 | $5.0 |
| | | More than once per month | 0.005 | 0.025 | $5.0 | $25.0 |
| | Open Email Attachment | Less than once | 0.001 | 0.005 | $1.0 | $5.0 |
| | | More than once | 0.004 | 0.02 | $4.0 | $20.0 |
| Disclose Personal Information | Post on Social Networking Sites | Less than twice per week | 0.00005 | 0.00035 | $0.5 | $3.5 |
| | | More than twice per week & less than 8 times per day | 0.0005 | 0.0035 | $5.0 | $35.0 |
| | | More than 8 times per day | 0.002 | 0.014 | $20.0 | $140.0 |
| Fall for Phishing Email | Open Email Attachment | Less than 5 times per day | 0.001 | 0.005 | $4.5 | $22.5 |
| | | More than 5 times per day | 0.004 | 0.02 | $18.0 | $90.0 |
| | Request Blacklisted Website | Less than once per month | 0.002 | 0.01 | $9.0 | $45.0 |
| | | More than once per month | 0.007 | 0.035 | $31.5 | $157.5 |
| | Read Email from Smart Phone | Yes | 0.003 | 0.021 | $13.5 | $94.5 |

FIG. 5

Sample Meta-Data Elements to Help Select and Prioritize Training Interventions

| 22 Available Training Interventions | Training Need Covered (Threat Scenario) | Risk Reduction (Per Threat Scenario) 1 week | Risk Reduction (Per Threat Scenario) 1 month | User Time Required | Prerequisite | 508 Compliance |
|---|---|---|---|---|---|---|
| URL Parsing Training Game | Infect Computer With a Virus | 75% | 55% | 6 min | None | Yes |
| | Disclose Sensitive Information | 80% | 60% | | | Yes |
| Mock Malicious USB Attack | Infect Computer With a Virus | 95% | 75% | 2 min | None | Yes |
| | Disclose Sensitive Information | 80% | 60% | | | Yes |
| Mock Malicious Wi-Fi Attack | Disclose Sensitive Information | 25% | 5% | 1 min | None | No |
| Safer Browsing Training Module | Infect Computer With a Virus | 50% | 35% | 8 min | None | Yes |
| | Disclose Sensitive Information | 50% | 40% | | | Yes |
| Smart Phone Security | Install Malicious App | 75% | 65% | 10 min | Module 101 | Yes |
| | Fall for SMS Phishing attack | 75% | 80% | | | Yes |
| | Have Phone Stolen | 75% | 80% | | | Yes |
| | Disclose Location on Social Network | 75% | 70% | | | Yes |
| | Bluetooth Attack | 75% | 80% | | | Yes |

FIG. 6

| Short Sensor Description | Possible Implementation |
|---|---|
| Dangerous program sensor | Based on signatures of programs known to be dangerous |
| Attachment sensor | Looking at saved attachment directory |
| Configuration sensor | Detects specific OS, browser and email client on a given machine to possibly tailor relevant training |
| WiFi roaming sensor | Keep strack of WiFi access points user attaches to & determines whether they are off/on corporate network |
| Locator | Analyzes IP address or collect WiFi or even GPS locations(depending on client) |
| Phishing website sensor | Determines if user frequently visits sites that have been blacklisted/recently taken down |
| Password change sensor | Detects when users are due to change their passwords (e.g. based on corporate policy or based on some heuristic) |
| USB Device sensor | Raises an event when a USB drive is connected |
| Social networking sensor | Senses amount of time spent on social networking sites |
| Social data sensor | Scans social networks to see how much information an employee has posted |

FIG. 11

Sample Training Needs Model with Threshold Levels

| 12020<br>Threat Scenarios | 12030<br>Sensed User Action | 13010<br>Threshold Level | 13020<br>Training Needs |
|---|---|---|---|
| Open a Malicious Attachment | Request Blacklisted Website | More than once per month | Malware (High), Email Security (Medium), Safe Browsing (High) |
| Open a Malicious Attachment | Open Email Attachment | More than 5 times per day | Email Security (High), Malware (High), Safe Browsing (Medium) |
| Fail for Phishing Email | Open Email Attachment | More than 5 times per day | Email Security (High), Malware (High) |
| Fail for Phishing Email | Request Blacklisted Website | More than once per quarter | Email Security (High), Malware (High), Safe Browsing (High) |
| Fail for Phishing Email | Read Email from Smart Phone | Yes | Email Security (High), Smart Phone Security (High) |

FIG. 12

Threat Scenarios & Indicative User Actions

22010

| 22020 Threat Scenario | 22030 Relevant Sensed User Actions |
|---|---|
| Open a Malicious Attachment | Request Blacklisted Website, Open Email Attachment |
| Infect Computer With a Virus | Post to Social Network, Request Blacklisted Website |
| Disclose Personal Information | Post to Social Network |
| Fall for Phishing Email | Open Email Attachment, Request Blacklisted Website |

Sensed User Data

| User | 22030 Sensed User Action | Date |
|---|---|---|
| User 1 | Opened email attachment | 12/12/2012 |
| User 1 | Post to Social Network | 2/12/2012 |
| User 1 | Post to Social Network | 2/13/2012 |
| User 2 | Create DVD | 12/14/2011 |
| User 2 | Changed Password | 1/2/2010 |
| User 2 | Opened PDF Viewer | 1/13/2012 |
| User 2 | Used Browser Plugin | 1/27/2012 |

FIG. 13

Sample Meta-Data Elements to Help Select and Prioritize Training Interventions

| Available Training Interventions | Training Need Covered (Threat Scenario) | Risk Reduction (Per Threat Scenario) 1 week | Risk Reduction (Per Threat Scenario) 1 month | User Time Required | Prerequisite | 508 Compliance |
|---|---|---|---|---|---|---|
| URL Parsing Training Game | Infect Computer With a Virus | 75% | 55% | 6 min | None | Yes |
| | Disclose Sensitive Information | 80% | 60% | | | Yes |
| Mock Phishing Attack | Infect Computer With a Virus | 95% | 75% | 2 min | None | Yes |
| | Disclose Sensitive Information | 80% | 60% | | | Yes |
| Email Security Training Cartoon #25 | Disclose Sensitive Information | 25% | 5% | 1 min | None | No |
| Email Security Training Game | Infect Computer With a Virus | 50% | 35% | 8 min | None | Yes |
| | Disclose Sensitive Information | 50% | 40% | | | Yes |
| Smart Phone Security | Install Malicious App | 75% | 65% | 10 min | Module 101 | Yes |
| | Fall for SMS Phishing attack | 75% | 80% | | | Yes |
| | Have Phone Stolen | 75% | 80% | | | Yes |
| | Disclose Location on Social Network | 75% | 70% | | | Yes |
| | Bluetooth Attack | 75% | 80% | | | Yes |

FIG. 14

CONTEXT-AWARE CYBERSECURITY TRAINING SYSTEMS, APPARATUSES, AND METHODS

CROSS REFERENCE TO RELATED APPLICATIONS

This patent document is a continuation of U.S. patent application Ser. No. 14/216,002, filed Mar. 17, 2014 ("the '002 application'). The '002 application claims priority to U.S. Provisional Patent Application No. 61/793,011, filed Mar. 15, 2013, titled Context-Aware Training Systems, Apparatuses and Methods. The '002 application also claims priority to, and is a continuation-in-part of U.S. patent application Ser. No. 13/442,587, filed Apr. 9, 2012, entitled Context-Aware Training Systems, Apparatuses and Methods ("the '587 application"), which in turn claims priority to: (i) U.S. Provisional Patent Application No. 61/473,384, filed Apr. 8, 2011 and entitled Behavior Sensitive Training System; and (ii) U.S. Provisional Patent Application No. 61/473,366, filed Apr. 8, 2011 and entitled System and Method for Teaching the Recognition of Fraudulent Messages by Identifying Traps Within the Message. The '002 application also claims priority to, and is a continuation-in-part of, U.S. patent application Ser. No. 13/832,070, filed Mar. 15, 2013, which is a continuation of the '587 application and the provisional applications described above.

This document fully incorporates each of the patent applications listed above by reference.

BACKGROUND

This document pertains generally to context-aware cybersecurity training and, particularly to training systems, apparatuses, and methods that select and provide cybersecurity training to a user based on action of a user.

Computer-based training systems and other forms of electronically supported learning and teaching (generically referred to as e-Learning systems) have traditionally relied on one-size-fits all training material, where the same collection of modules has to be taken by everyone. In addition, cybersecurity training has traditionally been delivered to users in the context of face-to-face lectures, training manuals, and software training modules, including interactive training modules. The benefits of these traditional cybersecurity training methods have often proven to be limited. This is in great part because this training is often abstract and delivered out of context.

This document describes methods and systems that address at least some of the issues described above, or additional issues.

SUMMARY

In an embodiment, a system that includes one or more processors provides cybersecurity training to one or more electronic device users. The system does this by accessing identifying information relating to a user of an electronic device. The system may select a mock attack; cause the mock attack to be delivered to a user of the electronic device via the electronic device in the user's regular context of use of the electronic device; sense an action (or lack thereof) of the user in a response to the mock attack; and use the sensed action to determine a susceptibility of the user to a cybersecurity threat. The system may also determine that the user should receive a training intervention; and select a training intervention from a set of at least one training intervention and delivering the selected training intervention to the user.

In various embodiments, causing the mock attack situation to be delivered to the user via the device in the user's regular context of use of the device may include luring the user to use the device to interact with any of the following mock attacks: a mock rogue wireless service; a mock malicious message; a mock malicious memory device; a mock malicious short-range tag; a mock malicious barcode; a mock social networking attack; a piece of mock malware; a mock malicious URL; or a mock rogue, compromised or malfunctioning device or service. For example, if the mock attack situation comprises a wireless service such as a wireless local area network service, a wireless personal area network service or a near field communication service, the system may detect a request to connect the device to the wireless service. If the mock attack situation comprises a network service or device that broadcasts an availability message, the system may detect a request to connect the electronic device to the network service or device. If the mock attack situation comprises an attack that lures users to install fake malware, the system may detect a request to install the fake malware on the device.

Optionally, the sensed action may include receipt of identifying information in response to the mock attack situation. If so, then when using the sensed action to determine whether the user should receive a training intervention the system may use the received identifying information in the response to determine whether the response originates from a registered user, and only deliver the selected training intervention if the response originates from the registered user. As another option, the sensed action may include receipt of identifying information in response to the mock attack situation. If so, then when using the sensed action to determine whether the user should receive a training intervention the system may use the received identifying information in the response to determine whether the response originates from a device that is a known device, and only deliver the selected training intervention if the response originates from a device that is a known device. In some embodiments, the system may determine both (i) whether the response originates from a user who is a registered user and (ii) whether the response originates from a device that is an approved device. If so, the system may deliver the selected training intervention if the response originates from a registered user who is not using an approved device.

In some embodiments, determining whether the user should receive a training intervention may include determining whether the user has responded to at least a threshold number of mock attack situations; or determining whether the user has performed a triggering action in response to the mock attack situation.

In some embodiments, selecting the training intervention may include using the sensed action to identify a threat scenario for which the user is at risk; identifying a collection of available training interventions that are relevant to the threat scenario; and selecting from the collection, based on the identified threat scenario, the training intervention to be delivered to the user.

If the mock attack situation comprises a mock social engineering call, the system may detect whether the user has provided sensitive information in response to the mock social engineering call, or whether the user has initiated some other activity placing the user or an organization associated with the user at risk. If the mock attack situation comprises delivering a mock malicious memory device to the user, the system may detect that the user has taken one or more of the following actions: connected the memory device to an electronic device, opened a file stored on the memory device, or provided the memory device to another person.

In an alternate embodiment, a system provides cybersecurity training to a user by: selecting a mock attack situation for a user, wherein the mock attack situation requires the user to be within a vicinity of a location to receive the mock attack situation; identifying an area within which the user is likely to be; causing the mock attack situation to be deployed in the area; after the user comes within the vicinity of the area, sensing an action of the user in response to the mock attack situation; based on the action, determining whether the user should receive a training intervention; if so, selecting a relevant training intervention from a set of one or more training interventions; and delivering the selected training intervention to the user.

Examples of mock attack situations include a wireless service that includes a Wi-Fi network, in which case the sensed action may include a request to connect the device to the Wi-Fi network. As another example, the mock attack situation may include a near field communication device that broadcasts an availability message, in which case the sensed action may include a request to connect the device to the near field communication device. As another example, the mock attack situation may include a barcode that, when scanned, will connect a device to a mock malicious URL. In this case, the sensed action may include indicia that the user has used a device to scan the barcode and requested to connect the device to the mock malicious URL.

Other embodiments, which may include one or more parts of the systems or methods described above, are also contemplated, and may thus have a broader or different scope. Thus, the embodiments in this Summary are mere examples, and are not intended to limit or define the scope of the invention or claims.

Accordingly, the methods and systems described in this document provide solutions to various shortcomings of prior training systems and methods. Other details, features, and advantages will become further apparent in the following detailed description.

BRIEF DESCRIPTION OF THE FIGURES

The accompanying drawings, which are incorporated herein and constitute part of this specification, and wherein like reference numerals are used to designate like components, include one or more embodiments of the invention and, together with a general description given above and a detailed description given below, serve to disclose principles of embodiments of behavior sensitive training.

FIG. 4 illustrates an embodiment of a partial training needs model based on simple threshold levels.

FIG. 5 illustrates elements of another embodiment of a training needs model.

FIG. 6 illustrates elements of an embodiment of a context-aware cybersecurity training system.

FIG. 11 illustrates one example of a collection of cybersecurity training sensors that may be used in a context-aware cybersecurity training system and ways in which those sensors can be implemented.

FIG. 12 illustrates an alternate embodiment of a partial training needs model based on simple threshold levels.

FIG. 13 illustrates an embodiment of a partial list of possible threat scenarios 12020 a context-aware cybersecurity training system may monitor.

FIG. 14 illustrates elements of an alternate embodiment of a context-aware cybersecurity training system.

DETAILED DESCRIPTION

Figure 1:
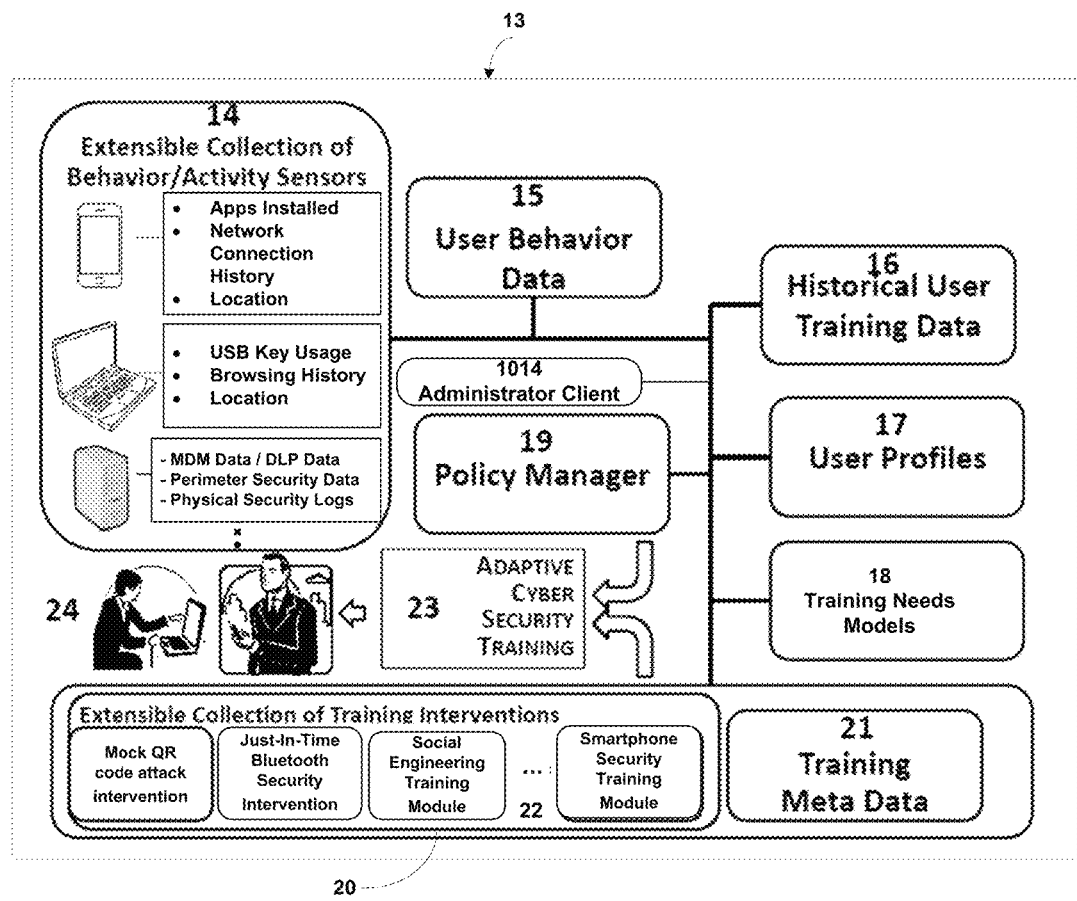
FIG. 1 illustrates one examples of a configuration of a context-aware cybersecurity training system.

This document describes various embodiments involving cybersecurity training methods and systems based on mock attacks. It will be appreciated that these embodiments and implementations are illustrative and various aspects of the invention may have applicability beyond the specifically described contexts. Furthermore, it is to be understood that these embodiments and implementations are not limited to the particular compositions, methodologies, or protocols described, as these may vary. The terminology used in the following description is for the purpose of illustrating the particular versions or embodiments only, and is not intended to limit their scope in the present disclosure which will be limited only by the appended claims.

Throughout the specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments. References to "or" are furthermore intended as inclusive, so "or" may indicate one or another of the ored terms or more than one ored term.

For the purposes of this document, the terms "electronic device" and "computing device" interchangeably refer to a device or system of one or more devices that includes at least one processor and non-transitory, computer-readable memory. The memory may contain programming instructions that, when executed by the processor, cause the device to perform one or more operations according to the programming instructions. Examples of computing devices include personal computers, gaming systems, televisions, wearable electronic devices (such as smart watches), implantable electronic devices, and portable electronic devices such as smartphones, personal digital assistants, cameras, tablet computers, laptop computers, global positioning service (GPS) navigation devices, media players and the like. Where appropriate for the context, the term "electronic device" also may refer to a software application configured to operate on an electronic device, or firmware that is installed in an electronic device.

This document describes computer based training systems that may enable an administrator to trigger, or may allow the system to sense, use activity or behavior information in combination with user needs models, namely models of how critical it is for users engaging in these particular activities and behaviors to be knowledgeable of and proficient in different topics or training areas. The systems and methods may selectively prioritize those areas where the learner needs to be trained and selectively identify conditions where delivery of the training is likely to be most effective. That level of customization may be particularly valuable in domains where training content is vast or opportunities for training are limited (e.g. limited time), and where the training required by individual users varies based on their activities and behaviors. Identifying training needs based on static information (e.g. based solely on the department an employee works for, or his/her level of education) is often insufficient in these domains. Sensing activities, behaviors, or other contextual attributes can help better target training and mitigate consequences associated with undesirable behaviors.

In some embodiments, the methods and systems described below may sense user behavior and activity, such as a user response to mock attacks to determine user susceptibility to different types of cybersecurity threats and selectively identify training interventions that will be presented to individual users. The ability to tailor the cybersecurity training interventions presented to different users based on their susceptibility to different threats makes it possible to make better use of users' limited attention span when it comes to receiving cybersecurity training. This can be especially valuable as the number and types of threats to users can potentially be exposed to is large and continues to grow.

Various embodiments of context-aware training are directed to apparatuses, systems, and methods performing context-aware training. It will be appreciated by those skilled in the art, however, that a computer system may be assembled from any combination of devices with embedded processing capability, for example, computer, smart phone, tablet or other devices, including mobile or pervasive computing devices or appliances, electromechanical devices, and the like. The computer system can be configured to identify training interventions (or "training actions") relevant to individual users and push those training interventions to users, both pro-actively (in anticipation of future needs) or reactively (in response to a need as it arises).

A training intervention can take many different forms, such as an interactive software training module, a training video, training games or other multimedia training content delivered to the content through one or more output devices. It may be delivered in one or more installments, including installments that may only be delivered subject to the sensing of an action or lack thereof by a user (e.g., a mock attack intended to sense a user's susceptibility to a particular threat scenario, which may be conditionally followed by a just-in-time training message and/or the assignment of a training module to a user). Training interventions may be provided as soon as a particular event is sensed (e.g., a just-in-time training intervention) or may be provided for later delivery to a user, such as the assignment of a software training module or a training activity that has to be completed by a certain date. A training intervention may include multiple iterations such as taking an interactive training module until one reaches a certain level of proficiency.

A just-in-time training intervention should not be confused with a warning of an event that is about to happen. In contrast to a warning which focuses on reducing risk associated with a situation that is at hand or about to occur (e.g., a user about to initiate a dangerous action), a training intervention is intended to also impart the user with some tips, best practices principles or other knowledge likely to help the user from repeating the same mistake or engage in the same risky behavior in the future. Simply telling the user that he is about to be put at risk or telling him to not do something in a one-off manner does not equate to a training intervention.

Numerous specific details are set forth in the specification and illustrated in the accompanying drawings to provide an understanding of the overall structure, function, manufacture, and use of embodiments of context-aware training. It will be understood by those skilled in the art, however, that the invention may be practiced without the specific details provided in the described embodiments. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined by the appended claims.

FIG. 1 illustrates an embodiment of a context-aware training system 13. That embodiment of the context-aware training system comprises one or more sensors 14, user behavior data 15, historical user training data 16, static user profiles 17, training needs models 18, a policy manager 19, training content data 20, training meta-data 21, an extensible collection of user-oriented training content 22, an administrator client 1014, and rules and/or criteria for context-aware training 23 for delivery to a user 24.

The one or more sensors 14 monitor one or more aspects of a user's behavior or activities ("user actions"). Those user actions may include sensing the behavior of people other than the user (regardless of whether they are a user of the system), the behavior of other entities (e.g. organisms, organization, the environment) with which a given user interacts (e.g. sensing how they respond to actions by the user), and other relevant contextual attributes. Those sensors 2 as well as other elements of the training system may be operated by one or more entities and may be deployed across a wide range of geographies, including different jurisdictional boundaries. The sensors may be part of the system, or the system may rely on external sensors and simply analyze data that it directly or indirectly received from the sensors.

FIG. 11 illustrates an embodiment of a partial list of possible sensors that may be used in a context-aware cybersecurity training system. Some of the sensors listed in FIG. 11 are themselves aggregating data they collect from other sensors such as device drivers, browsers, operating system components, and more. User behavior data collected from those sensors 2 may be directly interpreted by a policy manager (i.e., 19 in FIG. 1) running on an analysis host computer or can be recorded in a data storage system for later analysis. In the case of an embodiment of a context-aware cybersecurity training system, sensed user data is analyzed to identify threat scenarios for which a user in a given context is most susceptible or most at risk.

The system may receive user behavior or activity data 15 and record that data over time in one or more data storage devices 1012. For example, the data may include relevant statistics relating to the user's behavior or activity over a period of time as received from the sensors. Those relevant statistics may include, for example, frequency of certain activities, frequency of certain behaviors, deviations from relevant baselines, and relevant trends.

The system may collect (as data received from the sensors) user behavior or activity data 15. The data may further be used in combination with historical user training data 16 which may be stored in one or more data storage devices and may include data related to the training one or more users have taken in the past. Historical user training data 16 may include information including when, and how well one or more users performed in prior training or assessments. For example, static user profiles 17 which may include a role of one or more individual user in the organization, their education levels, or demographic information for example, and may be stored in one or more data storage devices, may be used in combination with the historic user training data.

The system may store one or more user training needs models 18 in one or more data storage devices. A training needs model can include data and/or a rule set that the system may apply to correlate one or more behaviors or activities with training that is relevant to those behaviors or activities. User training needs models 18 may be qualitative or quantitative in nature, and may include a mixture of both qualitative and quantitative aspects. Training needs models may vary in complexity, ranging from simple "if-then" rules, for example, that map patterns of sensed data with training content typically required by people whose activity or behavior matches a given pattern (e.g., "if the user falls for a mock malicious barcode attack, select a training intervention that immediately teaches the user how to protect himself against malicious barcode attacks", or "if the user connects a mock malicious USB memory stick to his laptop and opens a mock malicious file stored on the USB, then immediately pop up a just-in-time training intervention, and enroll the user for later, more in-depth training on malicious memory devices"), to more complex quantitative models. An example of a more complex model may take into account considerations such as the probability that a user requires some type of training, the time it takes to take the training, the relative effectiveness of available training modules in addressing a given training need, the type of training a given user has taken in the past, the amount of time available to train the user and more. The system may include training needs models that are customized or unique to a user or group of users, or the system may include standard training needs models that it may apply to any user. An example of this is described below in the context of FIGS. 4 and 12.

The system may implement a policy manager 19, which may include computer-readable instructions to analyze user behavior data 15 subject to a relevant set of rules or other appropriate logic. The policy manager may use additional data such as: (a) historical user training data 16 for the user, other similar users, or both; or (b) static profile data 17 such as the role of the user and the education level of the user. Based on its analysis, the policy manager 19 may select one or more training interventions from an extensible collection of training intervention modules 22 (thereby implementing "context-aware" training functionality), or it may initiate activities aimed at collecting additional data about one or more users such as estimating their training needs in different areas through the creation of mock situations, the assignment of quizzes, or some other available option. The policy manager 19 may perform its analysis in light of one or more relevant training needs models 18. The system may then generate one or more instructions, commands or other outputs that cause selected training interventions 23 to be pushed or provided to the user 24. This can range from (i) accessing one or more training interventions, optionally customizing them, and eventually sending them to one or more output devices for delivery or presentation to the user, to (ii) assigning a training module to a user in the system, or even (iii) activating a semi-automated process that involves the delivery of a training message to a user (e.g. scheduling someone for a face-to-face training meeting on a particular topic).

Training content data 20 may be organized in the form of an extensible collection of training interventions 22, including any relevant training metadata 21. Alternatively, it may consist of a fixed set of training interventions, possibly even just one type of training intervention. A collection of training interventions 22 may range from very short training interventions intended to be delivered in a just-in-time fashion, to longer, more extensive training modules that users may be encouraged or required to take within a predetermined period of time. Training interventions 22 along with relevant training meta-data 21 may be stored in one or more data storage devices. Relevant training meta-data 21 for a training intervention may include information about the training needs the training intervention is designed to address, the format in which the training intervention can be delivered, the amount of time the training intervention typically requires, estimated effectiveness of the training intervention (possibly across all users or possibly for different subsets of users based on considerations such as level of education, age, gender, prior training to which the users have been exposed) and other relevant considerations. The training meta-data 21 may include annotations and those annotations may be used by a policy manager 21 to select training content that is most appropriate for one or more users and when to provide that training content to the user or user group. Some training interventions may also be customizable based on relevant contextual information, such as the activities the user is engaged in, time available to train the user, available devices to deliver the content, preferred user language, demographic information and other contextual information. In the cybersecurity training domain where a user's time is limited and there is an increasingly vast amount of cybersecurity best practices and strategies to which the user should ideally be exposed, the policy manager 19 may be able to use its input to identify and possibly prioritize one or more training interventions 22 in a way that will minimize, or at least help reduce, the chances users fall prey to those threats to which they are most susceptible based on their activities, behavior, prior training history and/or other relevant contextual attributes.

The policy manager 19 may operate autonomously or according to a mixed initiative mode. In a mixed initiative mode, a system administrator (e.g. a security analyst, a member of human resources in charge of training, or some other role in an organization) uses an administrator client 1014 to interact with the policy manager. In the mixed initiative mode, the system administrator may review results of the analysis conducted by the policy manager 19 and select one or more training interventions to address those training needs for which one or more users are at a particularly high risk. In that embodiment, the system administrator could launch a training campaign based on a special purpose cartoon to train all those employees who are scheduled to take their corporate laptops out of the country in the next two weeks because, based on the system's training needs model, those employees have been identified as being at a particularly high risk for laptop-related threat scenarios by the analysis conducted by the policy manager 19.

The collection of training interventions can change over time. For example, the system may include a user interface that enables an administrator to add, delete, or modify some or all the training interventions. The system may receive training interventions from different sources including, for example, corporate training developed in-house, external training interventions provided by vendors, training interventions obtained via personal subscriptions, and training interventions offered by service providers such as a doctor, a dietician, or a health club. In addition to the possibility that training interventions may vary over time, available sensors and other sources of contextual information may also vary over time. For example, a user may acquire a new mobile phone with additional sensors, a user may download a Mobile Device Management (MDM) client on his mobile phone, new data about the user may be collected by a new source, and a new source of data may become able to interface with the context-aware training system.

Sensed data about user behavior and activities can include activities conducted in cyber space, activities in the physical world or a combination thereof. Sensed data may include any activity or behavior that can be tracked, observed, or recorded in some manner, for example, driving behavior, physical, mental and social health-related activities and habits, professional activities, social activities, etc. Sensed data may also include data relating to the behavior of people (not necessarily users of the system) with whom the user interacts in some manner. For example, sensed data may include responses received by the user from people, organisms, objects, surrounding elements or other entities with whom the user interacts, whether directly or indirectly. Activities sensed may include general usage activities such as using a laptop, phone, tablet or other mobile electronic device having wireless data communication activity; or using a particular mobile electronic device such as a company-issued device. In addition, activities sensed may include more specific applications using the device listed above, such as downloading software or installing a memory device containing software, connecting to a wireless network, connecting to a short-range or near-field communication-enabled device, replying to an SMS message, placing or receiving a phone call using certain technology, or other activities.

Sensed data may also be provided by a system administrator via an administrator client, or retrieved from a data set containing profile and/or sensed activity or behavior data about the user. An administrator client may be software, or hardware that is running software, that supports a user interface by which an administrator may add or modify data or parameters relevant to the system (e.g. training needs models, parameters controlling the policy manager's logic), or may be able to review, edit and customize other parts of the system such as training interventions, including mock attacks, selected or recommended by the system. Sensed data may also include historical user training data or data obtained from other sources of information such as a corporate system with information about the scheduled deployment of smart phones in the enterprise. The latter sensed data, when processed by the policy manager 19 based on training needs models, can help anticipate the need to train employees in the area of smart phone security by different dates and can result in the assignment of smart phone security training interventions to different employees on different dates.

One or more sensors 14 can include one or more devices, artifacts or other sources of information. For example, sensors 14 can include hardware, software, electromechanical devices, bio-sensory devices, and sources of information provided by third parties. Sensors 14 can be used to sense one or more aspects of a user's activities or behavior, whether in the context of routine activities or in response to artificially created situations. The sensors may detect various actions of a user in response to a mock attack situation, such as the security of the user's communication network connection, whether the user is downloading an attachment or installing an application, the user's browsing history, and other data.

Examples of mock attack situations that the system may select and help deliver include:
  i. sending a mock malicious message (e.g., SMS, MMS, instant message, in-channel message delivered by a service such as a social networking site, or a message delivered using some other messaging technology such as WhatsApp) to a user (e.g., a mock malicious message with a mock malicious URL or a mock malicious attachment, or a mock malicious phone number, or a mock request for sensitive information);
  ii. a mock social networking attack involving a mock malicious post or update such as a post or update containing a mock malicious URL (e.g., a URL for a mock malicious website that prompts the user to enter sensitive information or exposes the user's device to mock malware) including a mock malicious URL that relies on one more levels of redirection, mock malicious attachment (e.g., a mock malicious picture, video, audio clip), a mock malicious phone number, a mock malicious barcode (e.g., QR Code®) that when read by a barcode scanner causes the computing device to access or download mock malware, a mock malicious post enticing a user to perform an activity that puts him, others, his organization or his country at risk;
  iii. giving a mock social engineering call to a user (including using a computer system to automatically place the phone call and interact with the user through an automated menu or some automated dialogue functionality such as Interactive Voice Recognition technology, multi-modal interactive technology, voice over Internet protocol (VOIP) technology, automated speech recognition technology, some other automated dialogue functionality) with the call requesting the user to provide sensitive information or to initiate a possibly sensitive activity (e.g. granting someone access to a resource, resetting someone's password, telling or requesting a colleague to do something, sending information to a colleague, installing malicious code, entering erroneous information in a computer system, evacuating a building in response to a mock malicious alert), instructing a colleague to ignore a warning, enticing someone to spread false information, or generally engaging in any other activity that could compromise the user's security or reputation, that of his organization or his country or that of some other people, organization or country;
  iv. leaving a mock malicious memory device such as a universal serial bus (USB) storage device on which mock malware at one or more locations where a user may be lured to pick up the device and plug it into a computer, directly giving or sending a USB or other memory device on which mock malware is stored to users to plug into their computer, dropping at one or more locations (e.g., a company cafeteria, booth at a tradeshow) some other portable memory device such as a DVD or an SD card with mock malware for users to possibly pick up and access from one of their computers, directly giving or sending some other portable memory device such as a DVD or an SD card with mock malware to users to access from one of their computers;

v. placing a mock malicious barcode (such as a quick-response QR Code® or other matrix code) or some other type of bar code on an object such as a poster or wall so that the code, when scanned by a mobile electronic device or some other computer device, causes the device to be directed to a mock phishing website, initiate the download of mock malware (e.g., a mock malicious software app) on that computer device, connect the device to a mock malicious service, or contributes to the delivery of a mock attack on another user;

vi. placing mock malicious short range tags such as mock malicious near field communication (NFC) or radio frequency identification (RFID) tags, or equivalent tags on objects with the tags when read by a mobile device or some other computer device, causing the device to be directed to a mock phishing website or a mock malicious service, initiating the download of mock malware on the device, demonstrating to users how such tags could expose them to other risks, or contributing to the delivery of a mock attack on another user;

vii. exposing a user to a piece of mock malware such as placing a mock malicious app in an app store (possibly a mock app store or a mock malicious app store link), or file transfer site (or mock transfer site) and providing the user with a link or other means to entice the user to obtain and download the mock malware (such as by displaying a message inviting the user to obtain what is described as antivirus software, but what instead is fake malicious software, or enticing the user to download a new game app), or distributing mock malware through various means such as using mock malicious memory devices or using mock malicious bar codes or mock malicious URLs as already described above;

viii. deploying a mock rogue wireless service such as a mock rogue Wi-Fi access point or mock malicious short range communication service (e.g. mock Bluetooth pairing) to lure users to connect via these mock rogue access points or communication services (e.g. by deploying such mock rogue services on company premises, near a coffee shop where employees of a company often go, or in an airport lounge;

ix. deploying some other mock rogue, compromised or malfunctioning device or service such as a mock compromised keypad or some other mock rogue, compromised or malfunctioning authentication or access granting device or service (e.g. mock malfunctioning electronic lock) that a well-trained user should be able to spot and possibly report; mock unapproved hardware that could be used by an attacker to obtain sensitive information or sensitive access (e.g. mock spying camera or microphone that a well-trained user should be able to spot and report), mock rogue jamming equipment that a well-trained user should report, mock malfunctioning access device, etc.;

x. using some other mock attack to entice (i.e., lure) users to do any of the following: access mock malicious websites; install mock malware on one of their computer devices; open mock malicious message attachments; disclose sensitive or dangerous information in a mock context; engage in a mock context in some other activity that has the potential of putting them, their organization, their country, others, other organizations or other countries at risk or of damaging their reputation; fail to engage in a mock context in some activity that, if not implemented, could have similarly deleterious consequences; or xi. repurposing an actual attack by making it harmless (e.g. replacing a poster that includes a malicious QR Code with an identical poster that includes a mock malicious QR Code, replacing a malicious attachment in an SMS message with a mock malicious attachment) and using the resulting attack as a mock attack to estimate the user's vulnerability to similar attacks.

Examples of how an administrative user may select, or the system may select and implement, a mock attack situation will be described below.

Examples of behavior or activity sensors 14 in the cybersecurity training domain include sensors that detect attachments in emails sent or received by a user, sensors to determine whether one or more users access different services over secure connections, sensors to identify the number, type and/or identity of applications installed on a user's mobile phone, sensors to track the physical locations that a user visits, sensors to keep track of the URLs that a user visits. Some sensors 14 can also include, for instance, sensors to detect USB key usage, record browsing history, identify Bluetooth headset use, sensors that detect the number or types of emails received, sensors that inspect the content of emails, and sensors that track the physical location of users. Sensors 14 can also include Mobile Device Management (MDM) clients and MDM infrastructure or Data Leakage Prevention (DLP) functionality, as well as data obtained from an MDM system, DLP system, firewall system, email filtering system, browsers, network proxies, or other types infrastructure components that can be used to monitor user activities and behaviors as well as other relevant contextual attributes (e.g. types of websites a user visits, emails they receive, phone numbers they call or receive calls from).

The sensors 14 can be embedded in or interface with smart phones, laptop computers, desktops, tablets, e-readers, body parts, or any other devices, appliances or elements of the user's local or global environment (e.g. smart home, smart car, smart office, or other mobile or pervasive computing device or appliance, including medical devices, surveillance cameras, and other environmental sensors). A sensor 14 may include a data storage device or processor, for example in microprocessor form, and can obtain data provided by the user, by people other than the user, by organizations, or by entities including colleagues, friends, family members, strangers, doctors. A sensor 14 may alternately or in addition obtain data provided by systems (including data aggregated and synthesized from multiple sources, including aerial sensors, space-based sensors, implanted devices, and medical devices). For example, a sensor 14 may sense calendar information, status updates on social networks, and credit card transactions and can sense information or actions obtained through video surveillance. Some sensors 14 may also sense a combination of data. Some sensors 14 may also sense that the user has fallen for a mock attack, including any of the mock attacks identified above.

The system may receive and analyze data from any or all of such sensors and use the data to determine whether the user is at risk of a threat scenario. Examples of how the system may receive and analyze sensor data will be described in more detail below. As an example of how the system may sense data, if the user is provided a memory device on which an executable fake malware file is stored, when the user uses the device (by inserting it into a computing device's port) or attempts to open the file, the fake malware may execute or cause the device to execute a command to send a message to the training system. The message may include data such as time and/or date of execution, an identification code for the computing device to which the memory is connected, and/or network identification data for a communication network to which the computing device is connected. As another example, if the message is a fake messaging service message, the message may lure the user into taking an action by including a phone number for the user to call, or it may contain a hyperlink to or address for a website, or it may contain an attachment such as an executable file. The system may sense whether or not the user took an unsafe action by monitoring for a communication from the website operator, the phone number operator, or the user device itself indicating that the user accessed the website, called the phone number, or downloaded and executed the attachment.

User behavior data 15 can be captured and recorded in one or more locations and may include relevant statistics, such as frequency associated with different types of events or situations, trends, and comparisons against relevant baselines. Such user behavior data 15 may help create a unique profile for each individual user that captures this user's activities and behaviors at a particular point in time or over different periods of time.

Historical user training data 16 may inform the selection of relevant training for a user by capturing the training history of that user. This can include the selection of relevant mock attacks as well as the selection of relevant training interventions in response to data collected in the context of mock attacks. Historical user training data 16 may include information such as: the training modules to which that user has already been exposed, how often and when that user was exposed to training modules, how well the user responded when taking the training modules, and other indicators of the user's proficiency in the area or areas in which the user has been trained. User proficiency can include, for example, recorded instances where the user failed to conform to expected best practices or apply relevant knowledge covered by the training system.

For example, if a mock attack involved luring the user with a USB memory device that contained fake malware, the system may include in the historical training user data the information on whether or not the user used that memory device within a period of time. Similarly, if the training intervention involved a fake malicious SMS message, the system may include in the historical user training data an indicator of whether or not the user acted upon the message, such as by calling a mock malicious phone number provided with the SMS message or clicking on a mock malicious hyperlink in the SMS message. The operator of the website to which the user links or the phone number that the user calls may serve as a sensor who will then provide information about the user, such as the user's phone number or electronic device identifier, to the training system for inclusion in the historical user training data and/or analysis by a policy manager.

Cybersecurity training and awareness for everyday users is a domain that stands to benefit significantly from context-aware training and in particular context-aware training based on mock attacks. The complexity of today's computers, including cell phones, tablets and other computer-powered or Internet-enabled devices, and networking systems make them vulnerable to an ever-wider range of attacks. Human users who adopt best practices and strategies (e.g. not falling for Internet-enabled social engineering attacks, regularly checking and installing software patches, adopting safe browsing practices, safe USB memory practices, safe security settings on their smartphones, etc.) can often help reduce their exposure to many of those threats. Training everyday users to adopt improved strategies that address potential threats can be a daunting task. Accordingly, an effective way to mitigate risks is to prioritize training for individual users based on the threat scenarios to which they are most likely to be exposed by taking into account information about user activities or behaviors and/or other relevant contextual attributes such as their prior training history and level of expertise as well as their responses to mock attacks representative of various threat scenarios to which they may be exposed.

Figure 2:
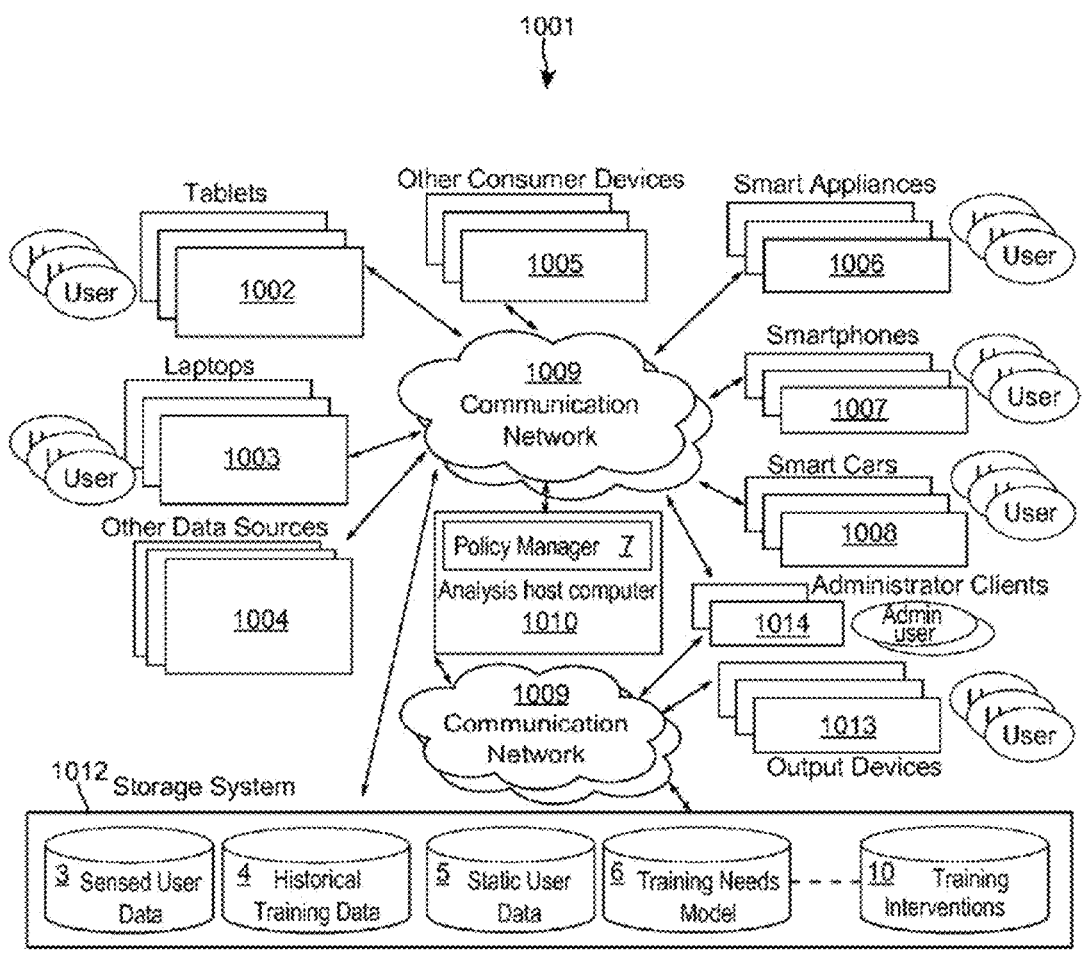
FIG. 2 illustrates a hardware configuration for an embodiment of a context-aware cybersecurity training system.

FIG. 2 illustrates a simplified view of a hardware configuration 1001 of a context-aware training system that may be used to facilitate the sensing and analysis of user activities and behaviors. The context-aware training system may perform one or more embodiments of the methods discussed generally herein. Thus, any of the methods provided herein may be, in various embodiments, performed using a processor of one or more of the computers of the system 1001. The configuration may include an analysis host computer 1010 connected via one or more communications networks 1009 to one or more computing or other electronic devices, which may include:

i. devices capable of sensing relevant elements of a user's activities, behavior and more general context such as tablets 1002, laptop computers 1003, other consumer devices 1005 such as cameras, wristwatches, smart appliances 1006 including smart televisions and refrigerators, smartphones 1007, smart cars 1008, and other sensing devices not represented in the figure such as, for example RFID readers, heart rate monitors, cameras, and hardware and software sensors capable of sensing different types of activities and behaviors, including the effects of actions by the user on himself, other people, other organisms, or elements of his surrounding environment;

ii. other data sources 1004 such as social networks, satellite imagery, public records, company records, criminal records, health, and financial records; and iii. devices capable of delivering training interventions to users such as tablets 1002, laptop computers 1003, smart appliances 1006, smartphones 1007 and other types of output devices 1013.

In general, different training interventions may utilize different delivery devices, such as some just with output capability, others with different combinations of output and input functionality.

The system may include a storage system 1012, which may comprise a plurality of storage devices, including cloud-based devices, possibly located across a plurality of locations. The storage system 1012 may serve as repository for static user data 17, recorded data 15 collected from one or more sensors, historical user training data 16, and training needs models 18. The storage system 1012 may also store part or all of the training content 22 and training meta-data available to the context-aware training system.

The computers 1002, 1003, 1007, 1010 and other devices 1005, 1006 and artifacts 1008, 1013 may be computers, computer systems or other electronic devices as described above and may each include at least one processor and possibly one or more other components of a computer or network of computers. For example, the analysis host computer 1010 may be a single server or could be a distributed computing platform or a cloud-based system running software such as Microsoft Windows, Linux or UNIX. The client configuration, participant computers, which may include one or more laptops 1003, tablets 1002, smart phones 1007, one or more administrator client devices 1014 or output devices 1013, may themselves comprise a collection of participant computers capable of network connectivity. Those devices may support any number of input and output functions. Those input and output functions may be embedded in the devices themselves or may be provided by satellite hardware such as a keyboard, mouse, display, or speaker. Devices may be connected to the network either through a physical hardwire connection or through wireless technology such as 802.11 Wi-Fi, Bluetooth, NFC, or GSM/CDMA/LTE cellular networks, or through other communication methods or systems. The operating system of each participant computer could include Microsoft Windows, Linux, UNIX, Mac OSX, Android, iOS, PALM, or another operating system. When relevant the computing devices may run browser software such as, for example, Mozilla, IE, Safari, Chrome or another browser software or browsing methodology. The type and configuration of the participant computing devices (e.g. 1002, 1003, 1007, and 1010) can be otherwise configured as desired.

The communication networks 1009 could be any type of data or computer communication network or any other technology enabling computers and possibly other devices or appliances to communicate with one another.

Figure 3:
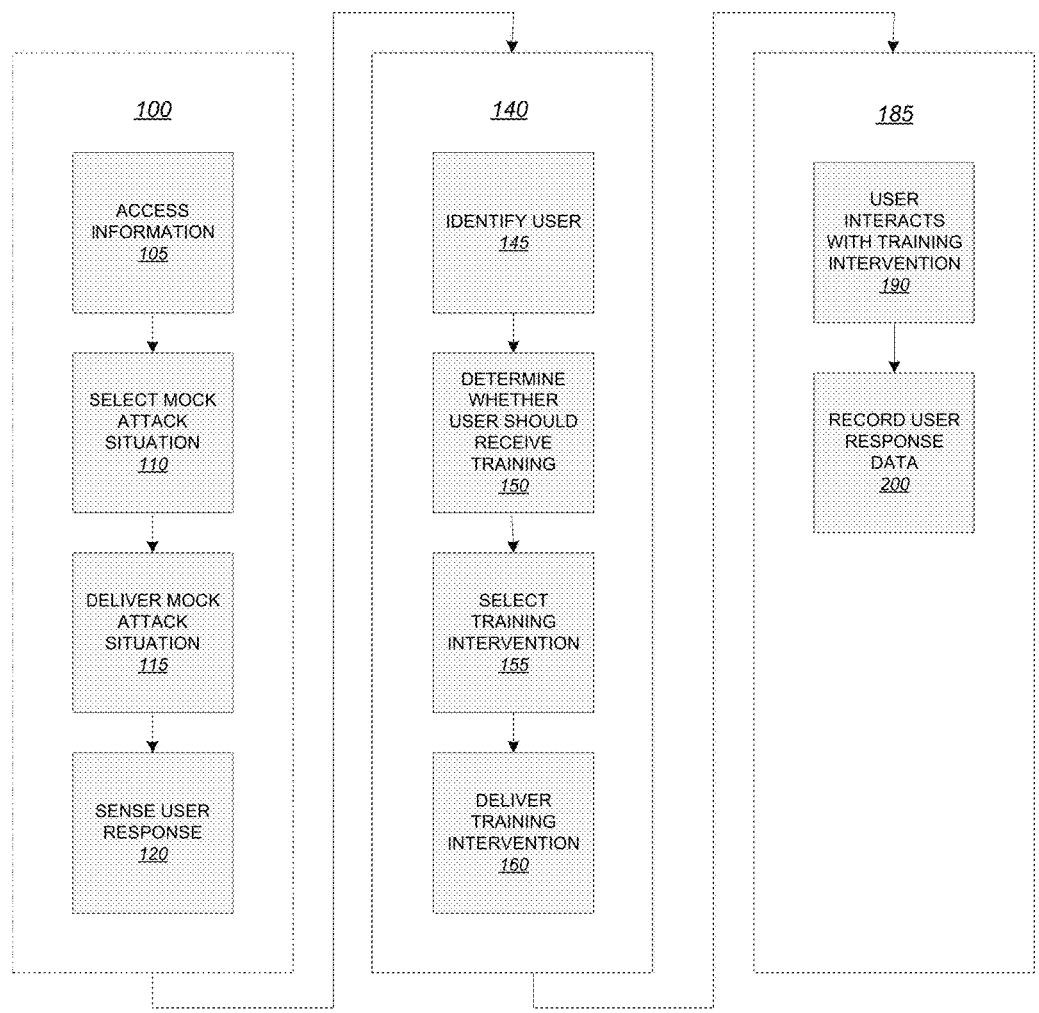
FIG. 3 illustrates an embodiment of context-aware cybersecurity training workflows involving the delivery of a mock attack situation.

One embodiment of a method of context-aware training that may be performed, for example, by one or more of the components illustrated in FIG. 2, is illustrated in FIG. 3. Three processes are illustrated in that embodiment: a mock attack selection and delivery process 100, a policy management process 140 and a response process 185. The system may run these processes sequentially or concurrently. Some of the steps illustrated in these processes are optional or may need to be sequenced differently for different mock attack situations. The mock attack selection and delivery process 100 may obtain information about a user and use that information to select, deliver and sense a user's response to a mock attack situation. The policy management process 140 may implement programming logic that determines whether to initiate, and which also initiates, training interventions. The response process 185 includes steps in which the system detects the user's interaction with the training intervention. Note that not all user activity and behavior sensing taking place in a context-aware training system is tied to mock attack situations. Sensed activity and behavior may generally come from a number of sensors and may encompass a broad range of activities and behaviors that are relevant to the policy manager's logic and the training needs models it relies on. It does not have to be limited to responses (or lack thereof) to mock attack situations. FIG. 3 just does not illustrate these additional possible sensing activities.

Cybersecurity training via mock attacks involves sensing user susceptibility to one or more threat scenarios by presenting a user with a mock attack situation in his or her actual context of use of a software program, a device, a service, or some other computer-mediated process. The system senses the user's response to the mock attack situation (or lack thereof) in an actual, everyday context of use (software program, a device, a service, or some other computer-mediated process). In this document, the phrases "actual context of use" and "regular context of use" are used interchangeably to refer to typical and ordinary conditions under which a user interacts with hardware, software or a service as part of his or her regular activities. This can range from browsing the web, reading email, responding to phone calls, accepting USBs at professional tradeshows, interacting with online services, accessing corporate systems, pairing one's cellphone with another device, unlocking doors with a security token, authenticating with any number of software or hardware artifacts, interacting with proximity tokens, granting permissions to other users, just carrying an electronic device with oneself as one goes about other activities, etc., as they are carried out by users as they go about their actual activities. In an actual context of use, when the user is presented with a mock attack situation, the user does not a priori know that the situation is a mock attack created to evaluate his or her readiness or susceptibility to different threat scenarios. This is in contrast to recording responses or lack thereof in the context of an interactive training module, a simulator, a drill, a quiz, or some other hypothetical or simulated situation in which the user actually knows that he or she is being evaluated.

Presenting a mock attack situation in an actual context of use can be particularly useful for improving user security readiness and/or reducing user susceptibility to different threat scenarios. This is because for most users security is not a primary task or a primary objective. For instance, at a given point in time, a sales representative's primary objective might be to make his quarterly quota, a software engineer's primary objective might be to meet a release date, and an executive assistant's primary objective might be to book a trip for his or her boss. Evaluating users in simulated situations where the user knows he is being evaluated changes this situation and makes security that user's primary objective at that particular point in time, thereby significant distorting the user's response. In addition, knowing that one failed a quiz or some other simulated exercise that was known not to be real is not the same as knowing that one failed to respond to a mock attack situation in one's actual context of use. The latter can humble users and get them to acknowledge that they need training. The end result is a teachable moment, where a user is more likely to pay attention and retain knowledge and tips offered to avoid falling for similar attacks in the future.

In some embodiments, the mock attack selection and delivery process 100 may include accessing identifying information 105, which may include the selection of users to be targeted by the mock attack. This information may be used to customize or deliver a mock attack situation. It may also be used to identify users who are being sensed in the context of a mock attack situation, such as identifying an action or lack thereof by a user, identifying a device associated with a given user (e.g., identifying a user carrying a particular Bluetooth-discoverable device), or determining whether a sensed device belongs to a user for whom prior consent (e.g. consent to record sensed activity and behavior and deliver training interventions) has been obtained. The identifying information may include, for example:

contact information about a user such as the user's name, phone number, email address, street address, cubicle number, personal social media handle, etc.;

some identifying information not tied to a particular device such as an account number, a user ID, or an ID associated with a software artifact or service not tied to a particular device (e.g., browser ID, video conferencing service ID).

some identifying information tied to a device, including services, clients, operating systems or other software artifacts running on that device (e.g., unique device ID, MAC address, IP address, mobile phone number, cookie), with such identifying information likely but not necessarily guaranteed to be tied to a given user.

one or more locations near which the user may be expected to come such as locations where a user or one or more of his or her devices may be within a range wherein a mock attack situation can be expected to be effective (e.g., an elevator lobby where some of the Bluetooth settings of a user's smartphone can be sensed, a coffee shop where the user may attempt to connect to a mock rogue Wi-Fi access point, a booth at a tradeshow where a user can be lured to pick up a promotional USB memory stick with mock malware, a rental car where a user could be exposed to a mock device pairing attack, a mock rogue authentication keypad placed by a door which a user is expected to use).

As used in this discussion, a device may be an electronic device that the user uses in an ordinary activity or carries with him or her as part of ordinary activities. The term device can also include the operating system, software applications and other software artifacts running on the device. Examples include smartphones, tablets and laptop computers, as well as also other devices such as a car, an electronic garage door opener, a security token, an activity tracking bracelet, an insulin pump, a prosthetic arm, and a smart wheelchair. A service is a service that the user may access via a device. Examples include a technology-mediated service such as a messaging service or a VOIP phone service for which the user has an account and an account ID, or it may also include any other service that could expose users to a threat scenario (e.g., a social engineering attack or shoulder surfing attack). The system could be involved in the delivery of a mock attack intended to measure user susceptibility and/or could be used to deliver follow-up training interventions.

Identification information about a device or service may also include, or may make it possible to retrieve, information that can be used to identify and customize available mock attacks (e.g., determining that a particular type of mock attack is only available for a certain type of device and a target user's device is not covered, or customizing elements of a mock attack situation to a particular user such as the particular features of that user's smartphone). In other words, in some embodiments the identifying information about the device or service may also be used to access additional information about the characteristics of the device or particular characteristics of the services, clients, operating system or other software artifacts running on that device (e.g., model, screen size, available functionality, operating system type).

The mock attack selection and delivery process 100 includes selecting a mock attack situation 110. FIG. 3 illustrates a process where the selection of the mock attack situation 110 may be based on the type of device, service, or location information available for a user or a group of users (as determined based on the information that the system accesses 105), given that some mock attack situations may not be practical due to lack of the necessary information.

Alternatively, the user action process may start with the selection of a mock attack situation 110, to the extent that multiple mock attack situations are available, and proceed with the customization of that mock attack situation by accessing relevant information about target users, in which case step 105 may follow step 110. Finally, in configurations where the system only supports a single type of mock attack (other than a mock phishing email attack), the user action process may simply amount to selecting those users to be targeted in a given instance of the one available mock attack.

The selection of the mock attack situation 110, which may include the selection of target users, may be done from a set of one or more available mock attack situations and it may be based on any suitable criteria to identify a relevant mock attack situation. This selection will typically be carried out by a policy manager, possibly based on one or more training needs models, either in an automated fashion, or manually via an administrator client, or through a semi-automated process, where an administrator has the ability to review and manipulate some aspects of the selection process. The selection process may associate different types of mock attack situations with different types of devices or services, with one or more elements of a user's context (e.g., role within the enterprise, prior training history, country where the user works, country where the user is scheduled to travel), with sensed data about the user (e.g., user who has downloaded a mobile banking application, user who connects his laptop to Wi-Fi networks outside the office, user who connects USB memory devices to his laptop), with sequencing considerations such as following a first mock attack with a second attack of the same type or of a different type, as well as with any other relevant data available to the system. The system may use any combination of this data to select a mock attack situation relevant to the device, service or location of one or more users. As indicated above, in some embodiments, the system may permit an administrator to control one or more elements of the process involved in the selection of the mock attack situation as well as to possibly customize some elements of the selected mock attack situation. In other embodiments, the customization process may be automated in full or in part based on logic contained within scripts or programs used in the delivery of the mock attack situation 115 or within logic embedded in the policy manager. Examples of this will be discussed below.

Once selected, the mock attack situation is delivered to the user in the user's regular context of use 115. The system may do this by generating a command, instruction, document or other communication to deploy a service, system or other necessary artifacts, by directly or indirectly deploying the attack (such as by sending an SMS message, placing a VOIP call, arranging for a USB to be delivered in the mail to the user, deploying a rogue Wi-Fi access point), any combination of the above, or any other relevant means.

The system may detect an interaction event comprising action of the user (or lack thereof) in response to the mock attack 120. By extension, the sensed user response should also be understood to include sensing of the configuration of a user's software or hardware artifacts (e.g., sensing that a user's smartphone includes Bluetooth settings that make the device discoverable) or sensing attributes of activities in which the user engages that expose him or her to particular threat scenarios (e.g., a user discussing sensitive matters on a smartphone in a public space, a user entering password information where he or she is at particularly high risk of a shoulder surfing attack). A sensor may directly detect the interaction event, or the system may receive data that is collected by a sensor. The data may correspond to user activities or behaviors or, more generally, other contextual attributes relevant to the selection of appropriate training interventions in response to a given mock attack or at a later stage. Such contextual attributes may include any relevant sensory data as well as information obtained from other relevant sources of information, such as browser history, credit card records, surveillance cameras, electronic doors, employment records, information collected about a person with which the user has interacted, and social networking information. They can also include time data, duration data, and any other relevant information about the user's interaction with a mock attack situation (e.g., sensitive information provided by the user, voice recording of the user's interaction). The interaction signature can be produced in various ways including using cryptographic hashes of one or more attributes of an interaction event. In some embodiments, sources of sensory data may forward sensed information to one or more other participant computers. In one instance, a software or executable program will run on a participant computer or device and locally process sensed data to detect one or more relevant interaction events prior to forwarding the detected information (e.g. in the form of interaction signatures) to a storage system. The executable program may include logic to locally deliver just-in-time training interventions in response to particular interaction events. In some embodiments, user data can be forwarded directly to the analysis host computer or computers responsible for hosting the policy manager. The storage system may be responsible, among other things, for storing sensed user data. The system may detect an action of the user 120 by filtering sensed data, aggregation of sensed data, pre-processing of the sensed data, analysis of the sensed data, and/or receipt of one or more event interaction signatures.

Continuing references to FIG. 3, the policy management process 140 may include identifying the user who initiated the response 145. This may be done by any suitable means, such as by receiving an event interaction signature that includes identifying information. An event interaction signature may include, for example, an identification of a device on which an executable mock malware file was installed, a phone number that the user was using, or other information that identifies the user or the user's computing device (e.g. cookie in a browser, unique phone ID).

The policy management process 140 may include determining whether the user who responded should receive training 150. At a high level, an early step in this process may be determining whether the user is a known user to whom the mock attack was directed for training purposes. In this document, the text may use the terms "known user" or "registered user" interchangeably to refer to a user whom the system has some identifying information about and who is an intended recipient of a mock attack. The policy management process or another process may include the step of registering a user as a registered user and, if necessary, obtain consent from the user to be exposed to mock attacks. This process may be driven by a system administrator or may be automated in part or in full. Alternatively, the registration process may be done directly by a user who registers and consents to receive mock attacks, or by a proxy for the user (such as the user's employer or any owner of the electronic device that the user is using). If the responding user is not a known user to whom the attack was directed or in a group to whom the attack was directed, the system may be programmed or configured to not deliver any training to the responding user. The system may also be programmed or configured to discard some or all information obtained from non-registered users. On the other hand, if the user is a known user who is a candidate for training then the system may initiate a training analysis at 150 and, when appropriate, identify one or more relevant training interventions from a collection of available training interventions, including possibly just-in-time training interventions.

In some situations, the system may use a combination of a user ID and device ID to determine whether to initiate a training intervention. For example, if the system receives identifying information relating to the user it may determine whether the response originates from a user who is a registered user. If the system receives identifying information relating to a device it may use that information to determine whether the device is an approved device. A device may be approved if it is registered to an organization (such as the user's employer) or permitted according to a policy of the organization. If the system determines that a registered user is using a non-approved device, it may deliver a training intervention to the user, such as a training intervention that is geared toward the use of only approved devices.

The policy manager is responsible for determining, and possibly prioritizing, the training interventions to be delivered to individual users. The policy manager in the embodiment illustrated in FIG. 3 initiates a training analysis process 150. As detailed earlier, the policy manager may draw on a number of available sources of information to inform this analysis process. This may include accessing static user data and sensed user data. Sensed user data may include relevant contextual data, whether obtained directly from a sensing device or participant computer, or whether obtained from parts of a storage system storing sensed user data. Gathering user data may also include retrieving relevant historical training data, retrieving relevant training needs models (to the extent that they are not stored locally on the analysis host computer), and/or retrieving training meta-data about available training interventions. The Policy Manager applies training needs models to select one or more training interventions 155 and cause the training intervention(s) to be delivered to the user 160. In some embodiments, the system may permit an administrator to customize some elements of the training interventions before the training intervention is deployed to the user. Optionally, the training may be delivered at a later time if the user is a registered user, as the system can use the user's contact information to determine an appropriate delivery method or may use the user's account in the training system (e.g. assigning a particular training module to the user), if the user has such an account. Alternatively or in addition, in a just-in-time scenario, one or more training interventions may also be delivered immediately, such as via the user's electronic device, even if the system does not have identifying information about the user. In some just-in-time scenarios, the training analysis may be conducted locally at the level of the device through which a mock attack is delivered or at the level of a sensor available to sense the user's response to a mock situation. In these configurations, the policy manager can be viewed as effectively being implemented in a decentralized fashion with one or more elements of the policy manager, running on different devices.

Referring again to FIG. 1, embodiments of the policy manager 19 may operate according to one or more modes. Those policy manager modes include scheduled modes, routine modes, real-time modes, mixed-initiative modes and combinations thereof. In an embodiment of context aware training in which a scheduled mode is utilized, the policy manager 19 regularly assesses the overall training needs of users and reprioritizes training interventions to be pushed or delivered to each individual user, including but not limited to mock attack training interventions. In some embodiments, that process may be fully automated. In other embodiments, that process may follow a mixed-initiative mode, where an administrative user (e.g. a system administrator, a member of personnel in charge of training, an analyst or some other suitable person, including possibly the user himself) reviews, via an administrator client, analysis results produced by the policy manager. Based on the analysis results produced by the policy manager, the system administrator may further select or prioritize training interventions that will be delivered to one or more users. The system administrator may include a user interface that allows a human user to schedule, select, define or modify a training intervention, as well as to select which user or users should receive the training intervention.

In particular, for example, the system administrator may launch a training campaign for a group of users whose estimated training need in a given area is above a certain threshold level. In another instance, a system administrator could select all those users who failed recent assessments via one or more mock malicious SMS attacks and who also receive more than 5 SMS messages per day to be exposed to a cybersecurity training intervention intended to teach them how to better protect themselves from malicious SMS attacks. Such a training intervention could also include the system administrator or policy manager 19 identifying groups of users who are perceived to be at particularly high risk for a combination of threat scenarios and scheduling training campaigns for those users involving one or more training interventions that specifically address those training needs.

Regular assessment of user training needs may involve running in batch mode, where all users are being reviewed in one batch or where different groups of users are processed in different batches, possibly according to different schedules. Regular assessment of user training needs may also include pushing short security quizzes and creating mock attack situations aimed at better evaluating the needs of an individual user or a group of users. In a real-time mode, the policy manager 19 may operate in an event-driven manner enabling it to more rapidly detect changes in user behavior or activities and other relevant contextual attributes, and to more quickly push training interventions that reflect the risks to which the user is exposed at a desired time. Any of those modes can be implemented in the form of simple rules or more complex logic that can potentially be customized and refined by an organization where, for instance, the organization is using administrator client software interfaces. Examples of such interfaces will be described beginning with the discussion of FIG. 9 below.

The rules or more complex logic can also be defined to allow for mixed initiative iterations with system administrators and users, where results from the analysis performed by the policy manager 19 are shown to the user and the user can interact with the policy manager 19 to refine the analysis, evaluate different options, and possibly finalize the selection, prioritization and scheduling of training interventions, whether for individual users or groups of users. The rules and/or logic of the policy manager 19 may be manually configured by system administrators, programmers or other qualified personnel (whether working for the organization providing the context-aware training system, for a customer organization, for a contractor working for either of those organizations, or by some other individual or group of individuals) or derived through statistical analysis or data mining techniques, or a combination of both. The administrator client software interface may also allow administrators to maintain and customize training needs models and other relevant parameters (such as the threshold levels, training needs and other parameters shown in FIGS. 4 and 5), data elements and elements of functionality of the context-aware training system. Maintenance and customization may include updating and customizing the collection of available training interventions, and updating and customizing individual training interventions, including associated meta-data (e.g. pre-requisites, compatible delivery platforms, required time, effectiveness and other meta-data). Maintenance and customization may also include accessing, reviewing and manipulating other relevant system data, including static user data, sensed user data, historical training data, and other meta-data. As an example of a customization element, an administrator may be able to define a rule that requires that a phone number used to initiate a mock SMS attack is one that has been whitelisted with the cellphone carriers of the users selected for the campaign.

Returning to FIG. 3, once relevant training interventions have been identified by the policy manager for one or more users, those interventions may be delivered or pushed to the user at 185. Delivery of training interventions, which may include training content as well as training interventions involving mock attacks, may be performed in a number of ways, including sending relevant training interventions directly to one or more output devices capable of delivering the identified interventions to the user. Delivering training interventions may also be performed by updating a schedule indicating when training interventions should be delivered or otherwise exposed to the user, or updating a schedule with a list of training assignments (e.g. interactive training modules) to be completed by different rates and communicating the updated schedule to the user—with the list of training assignments possibly including both required and recommended training assignments. In the former case, the system may for example generate a command to send an SMS mock attack message to a user at a specific time, and the system may then cause an automated SMS message to be transmitted to the user's mobile device at that specific time. Optionally, the system may ensure that it sends the SMS message via an outgoing phone number that has been appropriately "whitelisted" to ensure delivery to the user's device. As another example, the system may provide a human administrator with instructions for making fake malware-containing memory devices available to users by a given date. If so, it may provide the administrator with an interface by which the administrator may download the fake malware file(s) onto the memory device(s), or it may cause an order to be placed for fake malware-containing memory devices to be delivered to the user (e.g., placing an order with a supplier responsible for pre-loading software on memory devices).

Training interventions may include one or more dates by which the user should experience the training intervention, proficiency levels that may have to be achieved by the user while engaging with the training content (e.g. training quiz, training game, simulation exercise, responses to mock situations and other interactive types of interventions). Training interventions may also be performed through a combination of types of interventions including, for example, a delivery of a combination of just-in-time training interventions to the user, training assignments to be completed by the user by assigned dates or times, and recommendations for further training of the user. Training interventions, including training content, assignments, and recommendations, may also be provided to the user by other relevant means.

Training interventions may include the creation of mock attack situations, whether through fully automated processes (e.g. automated delivery of mock malicious SMS messages to a number of users), or manual processes (e.g. activating personnel responsible for creating mock situations such as mock impersonation phone calls intended to measure people's susceptibility to social engineering attacks), or hybrid processes (e.g. mock USB memory attack, where a USB includes fake malware intended to train one or more users not to plug USB memory sticks into a computer and further wherein such USB memory devices are manually scattered around an office to lure employees to pick them up). Training interventions may come in many different formats, ranging from video and audio content, to cartoons, alerts (e.g. alarms, flashing lights), training interventions involving personnel (e.g. a phone call from the boss of a user, a training session with a certified instructor, a conversation with the parent of a user), or any combination of the above or any other relevant format by which training content may be delivered to a user.

Returning to FIG. 3, in the response process 185, as users engage with the training interventions 190, their responses may be recorded in part or in whole 200. That response data itself may be analyzed in real-time by the policy manager or may be stored in an appropriate format, possibly for later analysis, (whether in raw form or in summarized form) in a part of the storage system responsible for storing historical training data or in a part of the storage system responsible for storing user behavior data, or some other relevant storage, or any combination of the above. Response data may include whether the user experiences the training, when the user experiences the training, how long the user takes to experience the training, whether the user's behavior changes after taking the training, the level of proficiency exhibited by the user while taking the training (e.g. in the case of an interactive training module), changes in the behaviors or responses of people the user interacts with after taking the training, or any other relevant data.

In some embodiments, the response collection process 185, mock attack selection and delivery process 100 and/or the training intervention process 140 may be integral. For example, the data collection process and training intervention process can together be implemented as an "if-then" rule pursuant to which the system delivers a training intervention if the system detects that a user has fallen for a particular mock attack situation.

In the user action and response collection processes, various sensors may be used to gather the data. The sensors may be physical sensors deployed at a location to receive data, or software-implemented sensor that analyzes a received response to identify certain data included in the response. Examples of sensors include: (i) sensors to detect whether a fake malware program was installed on, or whether a storage device was inserted into, an electronic device; (ii) configuration sensors that detect one or more hardware or software settings of an electronic device; (iii) a network sensor to detect whether a device is connecting to an unsecured network, a roaming network, or a near field or short range communication device; (iv) a messaging sensor; (v) a sensor that detects usage of a particular application, such as a social networking application; and (vi) others. Some of the sensors listed above may aggregate data they collect from other sensors such as device drivers, browsers, operating system components, and more. User behavior data collected from those sensors may be directly interpreted by a policy manager running on an analysis host computer or can be recorded in a data storage system for later analysis.

In the case of an embodiment of a context-aware cybersecurity training system, sensed user data is analyzed to identify threat scenarios for which a user in a given context is most susceptible or most at risk.

For example, the system may include one or more executable programming instructions that serve as dangerous program sensors. These sensors may be used to inspect the code of software running on devices operated by a user (e.g. static code analysis), monitor incoming and outgoing data flows as well as other behavioral characteristics associated with software running on devices operated by a user, and look for and report any static and/or behavioral signatures that are indicative of vulnerability to one or more threat scenarios. Examples could include instructions to identify dangerous mobile apps installed by a user on his smartphone, such as by accessing a database of known apps or analyzing certain properties of the app. Dangerous apps may be identified as apps that access sensitive application programming interfaces (APIs) or sensitive combinations of APIs (e.g., whether the app accesses sensitive APIs such as APIs to access the user's contacts list, the user's fine grain location, the phone's microphone, social media functionality, etc.), apps that access APIs or request permissions they ostensibly do not require, apps that are simply unknown to the system, or apps that have reviews indicative of potential vulnerabilities. The system can also include a sensor to monitor incoming and/or outgoing data flows or processing actions to indicating that the user has caused, installed, downloaded or acquired software requiring that the user opens up sensitive ports on his computing device, a sensor to identify that the user has installed, downloaded or acquired software known to have vulnerabilities, or that the user has installed, downloaded or acquired a software client associated with risky usage scenarios (e.g. peer-to-peer client software). Some of this sensing infrastructure may piggy back on functionality from a Data Leakage Prevention (DLP) system, a Mobile Device Management (MDM) system, a firewall system or any other infrastructure element with relevant sensing functionality that the context-aware training system may have access to.

Other examples of sensed data may include, for example:
i. filenames or other data relating to content of a user's saved file directory, such as a directory of saved email attachments or a directory of files downloaded using a browser client;
ii. data relating to the configuration of the user's browser, operating system, or some other software running on a device with which the user interacts;
iii. data indicating whether the user is using or has used a computing device on a Wi-Fi network, and whether or not the Wi-Fi network is a secured network or known, trusted network;
iv. location data obtained through one or more technologies (e.g., Wi-Fi location tracking, cell phone triangulation, Bluetooth beacons, RFID tags, credit card transactions, GPS, smartphone APIs, browser APIs, IP address) indicative of places where the user goes, or where the user has operated or attempted to access a particular computing system;
v. a phishing sensor, such as a monitor that receives data indicating whether (and optionally how frequently) a user visits or attempts to visit one or more blacklisted web sites, or a sensor looking at the number of emails received by a user and flagged as phishing emails by an email filter;
vi. a password vulnerability sensor, such as a monitor that receives data indicating how often a user changes his password or a sensor that estimates the strength of passwords selected by a user (e.g., the password must contain a minimum number of characters or a certain type or combinations of types of characters, such as at least one capital letter, at least one lowercase letter, and at least one number, or have some minimum length);

vii. an external memory device monitor that receives data from a computer indicating when an external memory device such as a USB memory device has been connected to a communication port of an electronic device operated by a user, potentially allowing for the transfer of malicious files on that electronic device;

viii a social networking sensor, such as a monitor that receives data from a browser or browser plug-in estimating the time that the user has spent accessing one or more known social networking websites; or ix. a social networking sensor that crawls known social networking sites looking to estimate the level and type of social networking activities in which users engage (e.g., data files, photos, videos, or comments posted by a user, location information leaked by a user, photos where a user is tagged, number of friends a user has). This may include estimating the amount of such data or activities, their frequency, their level of sensitivity, etc.

The system may include a dataset of possible threat scenarios for which a context-aware cybersecurity training system may determine that a user is at risk. The system may include a dataset of associations between threat scenarios and associated actions that may indicate that a person who performs the actions may be at risk for the threat scenario. These associations may provide a basis for a training needs model (See FIG. 4). For example, threat scenarios and associated actions may include: (i) downloading malware from a malicious USB memory device; (ii) downloading a malicious app on one's smartphone, (iii) connecting to a rogue Wi-Fi access point, (iv) falling for a malicious SMS message by providing sensitive information in response to such a message or by performing, in response to the SMS message, some other action that puts one or one's organization at risk (e.g., changing a password as instructed in a malicious SMS message); and/or (iv) falling prey to a bluesnarfing attack resulting in the theft of sensitive information.

Optionally, the system may receive sensed data relating to the user actions and/or behavior, and it may apply rules to determine whether the user is at risk for the associated threat scenario. These rules may include analysis of the action or behavior itself (such as the content of information posted to a social network) to determine whether the action satisfies a threat criterion such as any content that identifies an employee by name, a social security number, a corporate name, device ID or other prohibited content). Sometimes, to determine whether a user is at risk or contributes to susceptibility to one or more threat scenarios, the policy manager may require that a threshold of one or more indicative user actions be sensed, or that a particular user action be repeated a threshold number of times, possibly over a given period of time. For instance, assessment of the risk associated with a user falling for a malicious SMS threat scenario can benefit from monitoring activities that include how often a user replies to mock malicious SMS messages. The logic used by the policy manager to drive this analysis (whether automatically or in the context of mixed initiative interaction scenarios) may rely on one or more rules and thresholds or some more complex logic. It may be manually entered by an analyst or system administrator, may be derived using statistical analysis and/or data mining techniques, may be obtained through benchmarking activities involving one or more organizations, or any combination of the above.

Also, the system may receive sensed action data for multiple users and store that data in correlation with relevant attributes of the data, such as identifying information for the multiple users (e.g., unique device IDs for different users), a date of the action or actions taken by the users, in a data set such as a user profile, user behavior data set, or historical user training data set, where the data may be organized by users.

An embodiment of a partial training needs model based on simple threshold levels is illustrated in FIG. 4. The model may associate various threat scenarios 2020 with various user actions 2030 that may be detected. When the system determines that a user action 2030 has been taken at least a threshold number of times 3010 in response to the threat scenario, the model will identify one or more training needs 3020 that should be provided to the user, optionally with priorities for the training needs. For instance, a user who replies to a mock malicious SMS message from his smartphone is identified as being at a high risk of falling for such an attack. The training needs model associated with this particular threat scenario based on this particular combination of contextual attributes (in this case simply the fact that the user replied to an SMS message from an unknown sender) indicates that the user is in a high need for being trained in the area of messaging and smart phone security, the identified training needs 3020 associated with this particular threat scenario as identified for this particular user in this particular context.

An alternate embodiment of a partial training needs model based on simple threshold levels is illustrated in FIG. 12, with threat scenarios 12020, user actions 12030, threshold levels 13010 and corresponding training needs 13020. For instance, a user who reads email from his smartphone is identified as being at a high risk of falling for a phishing attack in that embodiment. The training needs model associated with this particular threat scenario based on this particular combination of contextual attributes (in this case simply the fact that the user reads email from his smart phone) indicates that the user is in a high need for being trained in the area of email security and smart phone security, the identified training needs 3020 associated with this particular threat scenario as identified for this particular user in this particular context.

FIG. 13 illustrates an embodiment of a partial list of possible threat scenarios 22020 a context-aware cybersecurity training system may monitor. Assessing a user's exposure to one or more threats or threat scenarios 22010 can benefit from sensing a plurality of indicative user actions 22030. For instance, assessment of the risk associated with a user falling for an email phishing threat scenario can benefit from monitoring activities that include how often a user opens email attachments or whether and how often the user attempts to access blacklisted websites.

A user may be identified as being at high risk for a number of different possible threat scenarios. In one embodiment, the policy manager is responsible for consolidating the training needs identified for the user and for identifying a suitable and possibly prioritized collection of training interventions, based on considerations such as the collection of training interventions available for addressing the collection of training needs identified by the model.

Some training interventions can address more than one training need. For instance a smart phone security training module may address both smart phone security at large as well as malicious messaging attacks in the context of smart phones. Training interventions selected by the policy manager may include immediate, just-in-time training interventions, assignments of training interventions the user should take by a certain date, and recommendations for additional training.

Elements of an embodiment of a slightly more complex training needs model 4000 including data based on one or more risk models is illustrated in FIG. 5. In this embodiment, the training risk model includes an estimate 4020 of the susceptibility of a given user to fall victim to a given threat scenario 2020 over different periods of time. The susceptibility estimates 4020 may vary based on the different sensed activities 4040 and/or by established frequency thresholds 4050 above or below which the user may be considered at risk or likely not at risk for a particular threat scenario 4060. Susceptibility estimates 4020 can be probabilities, can be based on historical data, can be maintained by security analysts, or can be estimated with the help of statistical analysis and/or data mining techniques. Susceptibility estimates can be maintained for different time horizons such as 24-hour 4020 and 1-week 4030 or other periods to help the policy manager 7 identify training interventions that may need to be more urgently delivered to the user, and training interventions that can be assigned to be taken within a longer time window (e.g. a few days, a week or even a month). Twenty-four-hour susceptibility and one-week susceptibility estimates may be related in different ways. For instance, some activities may be performed 5 days per week, whereas others may be performed at different frequencies (e.g., 1 day per month or 7 days per week).

Elements of the quantitative training needs model 4000 illustrated in FIG. 5 combine estimates of susceptibility and estimates of the incident cost 4010 associated with different threat scenarios to compute the risk associated with each threat scenario and possibly individual training needs for a given user in a given context. The training needs model 4000 also may include one or more costs of providing the user with training in response to the user being at risk for a threat scenario. Using the model illustrated in FIG. 5, the policy manager can identify a combination of one or more training interventions that will best mitigate the various risks to which a given user is susceptible at a particular point in time. That identification may include prioritizing identified training interventions, including differentiating between interventions that should be delivered right away and interventions that can wait a bit longer before being exposed to the user.

The particular format of the risk models shown in FIG. 5 and FIG. 6 are illustrative of different types of training needs models envisioned in the invention. It will be appreciated by those skilled in the art that similar considerations can be captured through different quantitative and qualitative variations of the training needs models illustrated in FIG. 5 and FIG. 6. Format variations include variations that rely on different ways of breaking down model elements aimed at capturing probabilities, costs, risks and reductions in risk associated with exposing different training interventions to a user. For instance, FIG. 6 presents an embodiment of a risk model 5000 where a cost associated with exposing a user to a training intervention 22 is approximated by the average time 5010 it takes a user to interact with that training intervention ("User Time Required"). A benefit of the intervention, such as a threat scenario addressed by the intervention 5030, or an expected risk reduction associated with the training intervention 5040, 5040 may be included in the model. Benefits may be approximated in the form of estimated risk reductions over a 1 week period 5040, a 1 month period 5050, or any other period following user exposure to the training intervention 22. The model also may indicate whether one training intervention is a prerequisite for another intervention so that the system may prioritize and/or sequence the interventions that the policy manager 19 directs to the user. Those skilled in the art will readily appreciate that a number of other parameters may be used to approximate the costs and benefits associated with exposing a user to a training intervention, starting with simple rule-based models that may possibly ignore the cost and/or benefit altogether to significantly more complex models accounting for a wider range of costs and considerations (e.g. licensing fee required for a training intervention, cost of getting the user's attention, cost of the user getting habituated to receiving training via mock attacks) and a wider range of benefits (e.g. indirect benefit of a user's likelihood to share his newly acquired knowledge with other colleagues).

FIG. 6 further illustrates parts of the data elements 5000 used by the policy manager to combine results from its analysis based on training needs models with meta-data about available training interventions. As already indicated above, the meta-data may include, for various training interventions 22, one or more types of threat scenarios 5030 the intervention is designed to address, the effectiveness of the intervention to reduce susceptibility to identified threat scenarios 5040, 5050, a cost 5010 such as the time it takes a user to interact with a given training intervention, the different access devices on which the training interventions can be delivered, a list of possible customization parameters (which may include, for example, elements of the training content, level of complexity, duration, and examples used to train the user), the expected medium and long-term retention of the knowledge the training intervention teaches, the languages in which the training intervention is available, whether the training intervention is available for visually impaired users (such as activities relating to "Section 508 compliance"), or a variety of other meta-data. Those skilled in the art will appreciate that many other considerations can be captured in such a model. FIG. 14 illustrates a variation of FIG. 6 with additional training interventions.

In another embodiment, a computer-implemented training system is contemplated in which a user computing device communicates with a remote analysis host computer. The computer-implemented training system includes an input device for receiving user input or a user action and a first processor coupled to the input device. The first processor has instructions which, when executed by the first processor, cause the first processor to receive a user initiated input from an input device, transmit an action associated with the input to a second processor, receive a training intervention, possibly including a mock attack situation, from the second processor, and provide the training action to the user. The computer implemented training system may also receive at least one input provided at the input device in response to the provision of the training action and transmit the at least one input provided in response to the provision of the training action to the second processor.

In another embodiment in which a user computing device (i.e., 1002, 1003, 1005, 1006, 1007, and 1008 illustrated in FIG. 2) communicates with a remote analysis host computer 1010, the analysis host computer 1010 receives the user input or user action from the user computing device, determines whether a need for training is indicated by the user input or action, selects a training intervention appropriate for the user input or action, and transmits the training intervention to the first processor if a need for training is indicated by the user input or action. The analysis host computer may also receive feedback, which may be in the form of additional user inputs, from user interaction with the training intervention and may further transmit additional training interventions or training intervention feedback to the user computing device.

Examples of the training interventions and meta-data described in FIG. 6 include training interventions commercialized by Wombat Security Technologies (e.g., Wombat Security Technologies' smart phone security training module, its Anti-Phishing Phil™ Training Game, its Anti-Phishing Phyllis™ Training Module, its training cartoons, its safe social networks training module, its email security training module, its password security training module, its Social Engineering training module, its Security Beyond the Office module, its Safer Web Browsing training module, its Phish-Guru™ training module, its Protected Health Information training module, its Compliance Training module, its Smish-Guru™ training module, its USBGuru™ training module, its CyberStrength™ assessment and training module. Relevant attributes, meta-data, user data, including historical training data, proficiency data and responses to mock attacks, may also include the type of data collected by Wombat Security Technologies Security Training Platform™ as well as data collected by its different training modules and its PhishPatrol™ email filtering module.

Figure 7:
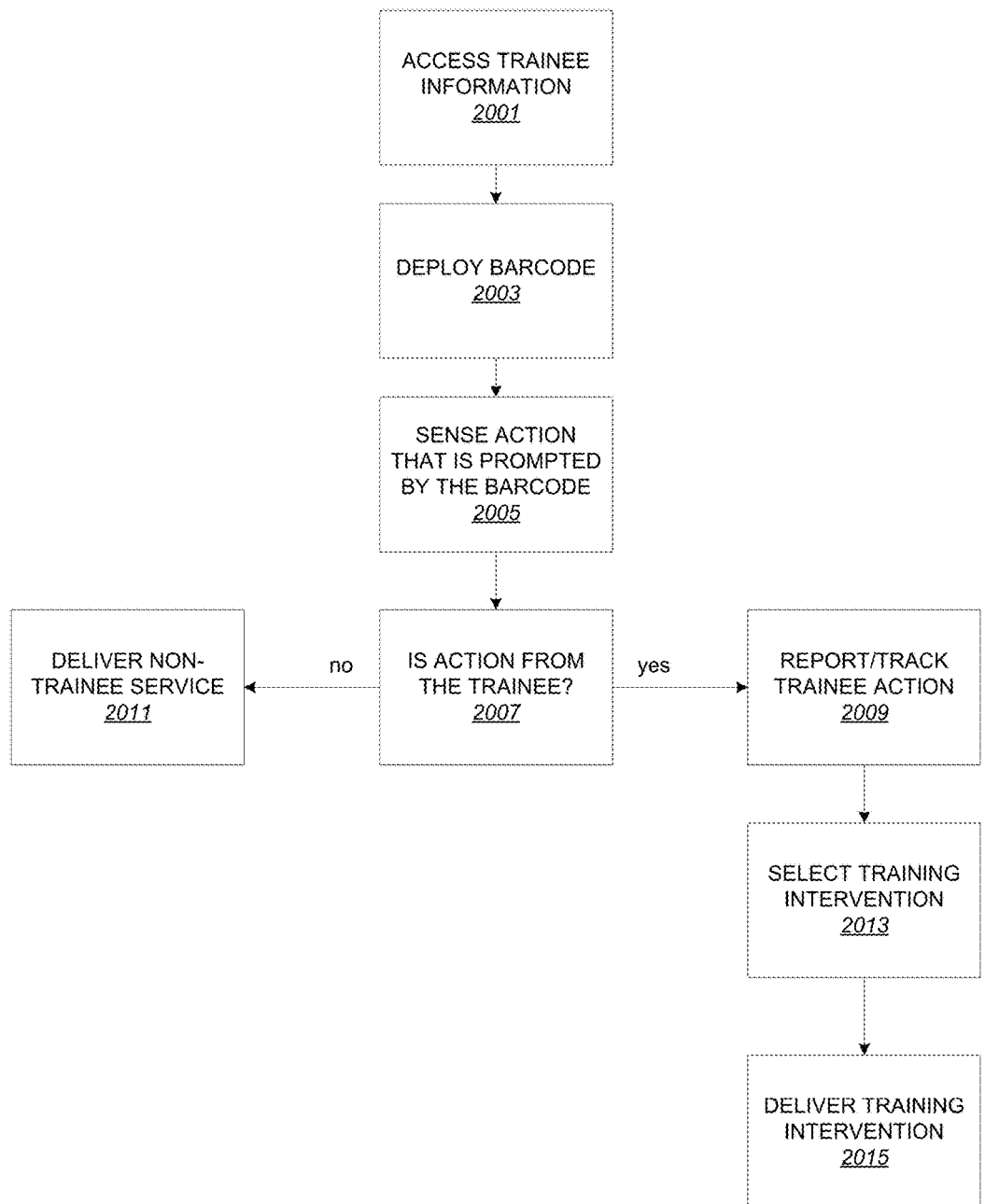
FIG. 7 is a flow diagram of a method of luring a trainee to a fake malicious service and delivering a training intervention to the trainee after the user takes the bait of the lure.

FIG. 7 is a flow diagram illustrating a method by which the system may deploy a mock malicious attack intended to (i) sense user susceptibility to malicious barcodes (such as QR Codes) and by extension other types of threat scenarios that involve interacting with potentially malicious bar codes, and, if deemed necessary, (ii) select and deliver a relevant training intervention. In this embodiment, the mock attack situation may involve the creation of a poster with a unique barcodes intended to lure users to scan the barcode with barcode scanning applications installed on their smartphones or other portable electronic devices. Upon scanning the barcode, the user's device may be redirected to a mock malicious webpage via their browser, or may be prompted to download a mock malicious mobile app on his or her smartphone. Those skilled in the art will appreciate that a number of other variations of this mock attack situation can readily be implemented, which each would correspond to slightly different variations of threat scenarios tied to users scanning untrusted barcodes with their smartphones. The process involved in generating this mock attack situation may be one that is fully automated, or may involve a system administrator interacting with an administrator client to customize elements of the mock attack (e.g., selecting from one or more templates, selecting the particular users to be targeted by the mock attack, customizing the content of the template to appeal to those particular users targeted in a particular mock attack, selecting the particular locations where the posters with the mock malicious barcodes will be placed, selecting between different variations of the mock attack such as whether to direct users to a mock malicious app store or to a mock malicious URL, deciding what data to sense for users who fall for the mock attack such as whether or not to differentiate between the different locations where the posters are placed by generating barcodes unique to each poster/location or to sense whether a user proceeds to actually download and launch a mock malicious mobile app, etc.). In general, the barcode may be any machine-readable representation of data that is interpretable by a scanning app likely to be available on the target user's mobile device. Examples may include a two-dimensional barcode such as a QR Code, Aztec code, or other symbol that contains encoded data that, when captured, directs the user's device to some mock malicious situation.

In the method of FIG. 7, the system may access identifying information necessary to recognize those users targeted by the mock malicious barcode attack as well as possible help customize elements of the mock attack (e.g., content of a poster on which the mock malicious barcode will be displayed) 2001. The identifying information may include a unique device ID. It may also be used to access information such as the departments of target users, locations where they are likely to be found (e.g., to determine where to place the posters), or some other information. The system may deploy a barcode 2003 containing encoded data necessary to direct the user's device to the mock malicious situation (e.g., a mock malicious app store, mock malicious app download link, mock malicious online form, or mock malicious URL) and/or sense the user's response. The barcode may also include data that correspond to instructions that cause the user's device to take one or more actions that could compromise the user's security, such as instructions to transmit a device ID or personally-identifying information about the user. The system may deploy the barcode on posters, flyers, TV displays, or other objects in areas or on items where the trainee may be susceptible to this type of attack. Examples of such locations include posters, maps or advertisements placed in or near a company elevator or break room, a subway station; airport or other transit facility, a college campus, or other location. Note that, while in FIG. 7, step 2001 is shown as taking place before step 2003, this sequence may vary. In other embodiments of the process illustrated in FIG. 7, deployment of the mock malicious bar codes 2003 may precede accessing identifying information 2001 necessary to identify those users falling for the mock attack. For instance, step 2001 may take place after step 2005 and before step 2007.

When a user uses a barcode scanning application on a mobile device to capture an image of the mock malicious barcode, the user's device will decode the data and use it to generate a request to access a mock malicious URL or perform some other action such as prompting the user to download a mock malicious mobile app, inviting the user to share a mock malicious link on a social network, or any number of other action that can be encoded in a barcode, interpreted by a barcode scanning application and used to create a mock malicious situation equivalent to a threat scenario the target user could possibly encounter. When the system detects that a user has performed an action 2005 that is prompted by the barcode, it may need to determine 2007 whether the action originated from a known trainee. It may do this by comparing the received device ID or some other user data to the known trainee information and determine if a match occurs. If the action did not originate from a known trainee, the system may be programmed to discard the data it collected and/or deliver a non-trainee service such as displaying a more generic training message, or displaying a "broken link" message, or redirecting the user to a non-trainee webpage (all of which are examples of delivering a non-trainee service 2011). If the action did originate from a known trainee, the system may capture and record identifying information about the trainee as well as the trainee's response action 2009, determine a training intervention that is appropriate for the trainee based on the trainee's action (using methods such as those described earlier in this document) 2013, and deliver the training to the trainee 2015. The training intervention may be delivered to the trainee via a service that the user accessed via the barcode (e.g. a webpage hosted at the mock malicious URL to which the user's mobile device was redirected), through an entirely different channel (e.g. an automated phone call or SMS message that uses information about the user that includes the user's cell phone number as well as possibly the location where the mock malicious barcode was scanned), by assigning a training module to the user, any combination of the above or of any other relevant means of delivering a training interventions. Optionally, the training action may only be delivered if the trainee responds to at least a threshold number of training interventions; it may only be delivered if the user takes certain predetermined actions in response to the training intervention; or it may only be delivered according to more complex training needs models and/or logic in the policy manager. Those skilled in the art will readily appreciate that the flow diagram illustrated in FIG. 7 could readily be adapted to capture embodiments of entirely different types of mock attacks (namely attacks corresponding to entirely different threat scenarios) such as mock attacks involving the use of mock malicious USB devices with mock malicious files. The specific templates, sensors and identifying information used to support such a process would be different, but the general work flow associated with some embodiments of such mock malicious attacks may be very similar, with mock malicious USBs being deployed instead of mock malicious bar codes.

Figure 8:
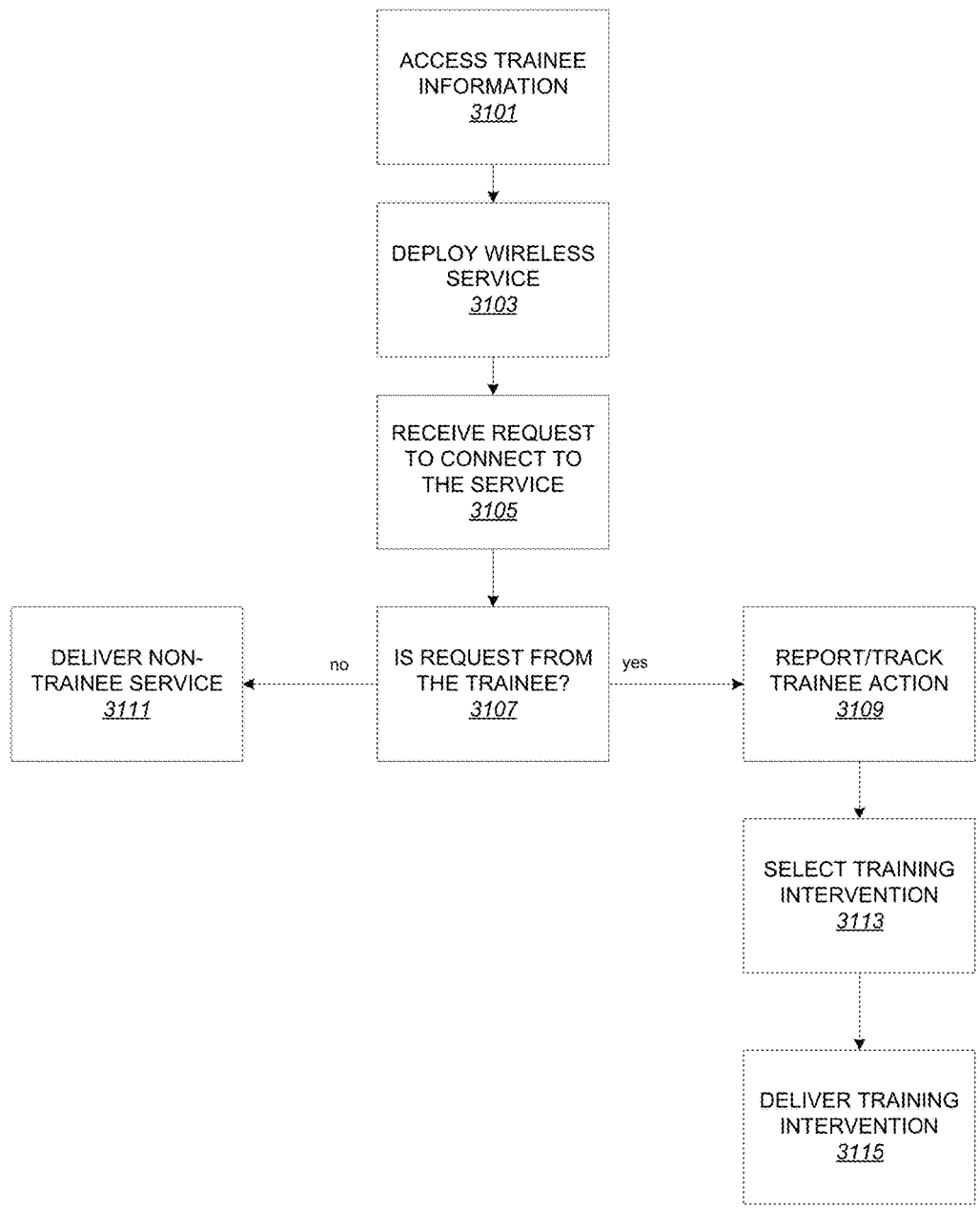
FIG. 8 is a flow diagram of an alternate method of luring a trainee to a fake malicious service and delivering a training intervention to the trainee after the user takes the bait of the lure.

FIG. 8 is a flow diagram illustrating another method by which the system may deploy a mock malicious entity service that helps deploy a training intervention. In this embodiment, the service may be a mock malicious wireless network, a mock malicious device with near-field communication (NFC) capability, or some other mock malicious service that the user's mobile device may connect subject to a triggering action by the user. For example, the triggering action may be a user selecting to connect to a mock malicious Wi-Fi network, a user accepting a pairing request from a mock malicious Bluetooth™-enabled device, a prompt from a mock malicious NFC-enabled authentication keypad.

In the method of FIG. 8, the system will access 3101 and store in a computer-readable memory trainee information about each user to whom the mock malicious attack may be being directed. The information may include a user identifier, name, department, role in an organization, location(s) where the user is likely to come, IP address, device identifier, or other information. The system may deploy a mock malicious wireless service 3103. The service may include, for example, a mock malicious Wi-Fi network, a mock malicious device that is equipped with near-field communication capability or with Bluetooth connectivity. Examples include a wireless local area network service, a wireless personal area network service, a near field communication reader (e.g., to control access to a particular building or to support mobile payment transactions), another type of wireless network, service or device. Optionally, the service may include identifying information that is designed to lure the user to connect to the service, such as a network or device name or a logo that incorporates a name of the trainee's company, or other words or images intended to inspire trust from the trainee. When the user connects to the mock malicious service, the service may also deploy a command to the user's device that causes the user's device to take one or more mock malicious actions illustrative of additional elements of the threat scenarios for which user susceptibility is intended to be assessed by the mock malicious attack (e.g., prompting users to enter credentials to access a mock malicious Wi-Fi network, downloading mock malware on the user's device, prompting the user to enter a PIN number to confirm a mock malicious payment request, or prompting the user to authorize the syncing of the contacts list stored on his smartphone with a mock malicious Bluetooth-enabled in-car phone system).

When the user requests to connect to the mock malicious wireless service 3105, the system may optionally determine 3107 whether the request originated from a known trainee. It may do this by comparing a unique device ID or some other identifying data obtained as part of the user request to determine whether the request is originating from a known trainee. If the request did not originate from a known trainee or device the system may deliver a non-trainee service to the user 3111, such as by connecting the user to an ordinary, functional Wi-Fi network. If the request did originate from a known trainee, the system may capture and record identifying information about the trainee as well as the trainee's response action 3109, determine a training intervention that is appropriate for the trainee based on the trainee's action (using methods such as those described earlier in this document) 3113, and deliver the training to the trainee 3115. The training intervention may be delivered to the trainee via the service that the user accessed, some other communication channel or output device or any combination of the above and of any other means to direct training interventions to the trainee. Optionally, the training action may only be delivered if the trainee responds to at least a threshold number of training interventions, or only if the user takes certain predetermined actions in response to the training intervention. Note that, while in FIG. 8, step 3201 is shown as taking place before step 3203, other sequences are possible. In other embodiments of the process illustrated in FIG. 8, deployment of the mock malicious wireless service 3103 may precede accessing trainee information 3101 necessary to identify those users falling for the mock attack. For instance, step 3101 may take place after step 3105 and before step 3107.

Figure 9:
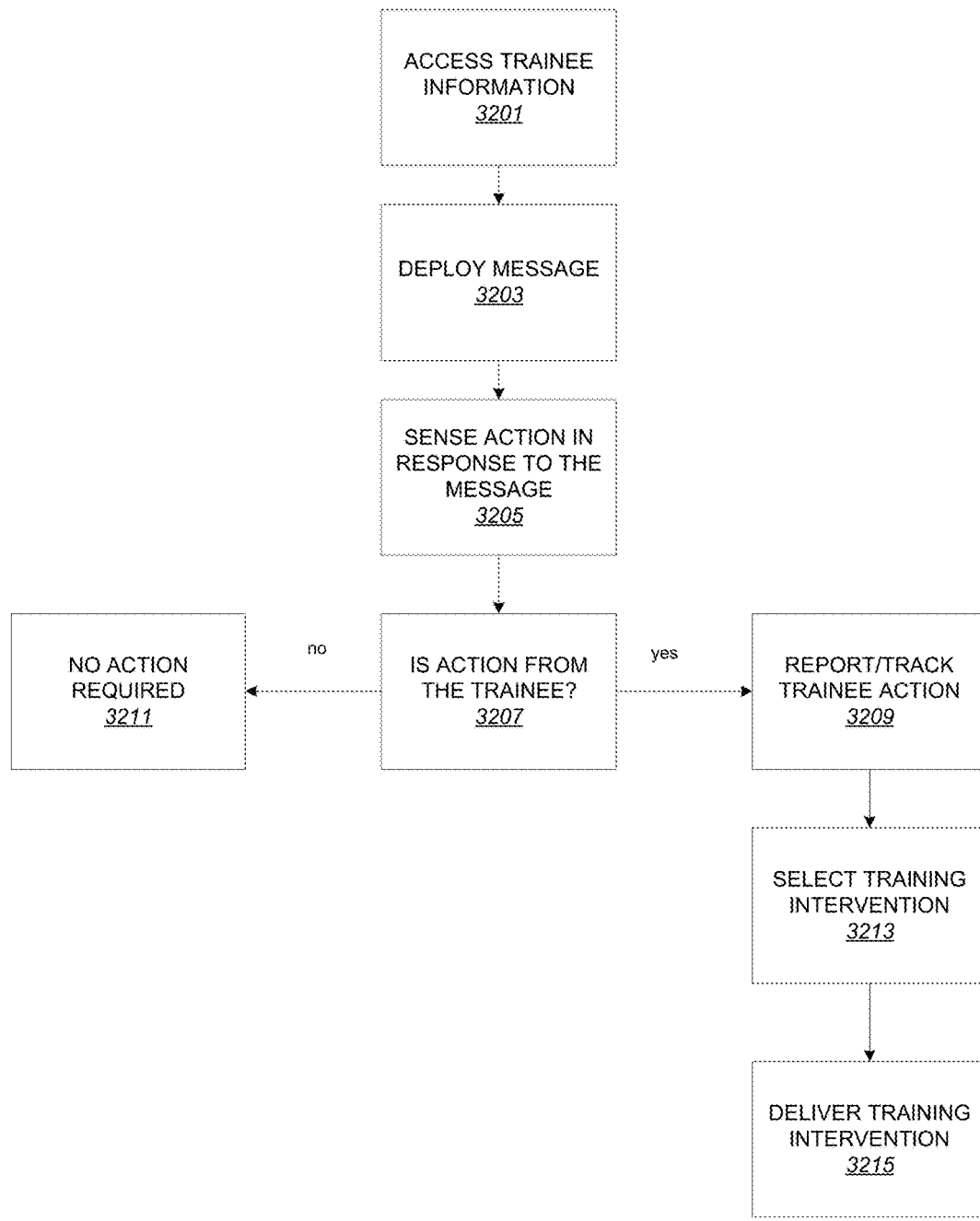
FIG. 9 is a flow diagram of an alternate method of luring a trainee to reply to a fake malicious message and delivering a training intervention to the trainee after the user takes the bait of the lure.

FIG. 9 is a flow diagram illustrating a method by which the system may deploy a mock malicious message attack (other than a mock phishing email attack) intended to (i) assess user susceptibility to threat scenarios involving the delivery of malicious messages, and, if necessary, (ii) deliver relevant training interventions relevant to the corresponding threat scenarios. In this embodiment, the mock malicious message may be, for example, an SMS message that prompts the user to reply with sensitive information, follow a mock malicious link in the SMS message (e.g. click-to-call link to connect to a mock malicious phone service that may in turn prompt the user to disclose some sensitive information such as a social security number, mock malicious mobile app download link, or mock malicious URL link), or open a mock malicious attachment. Other messages may include, for example, a VOIP call or social engineering call that prompts the user to take a particular action, such as provide sensitive information, or take another action that can place the user or the user's organization (e.g., employer) at risk. The mock malicious message may include descriptive information intended to lure the user to trust it by suggesting that it originates from a source that is trusted by the user, such as the user's employer, or descriptive information about the user such as information an attacker might realistically be able to gather from public online resources (e.g. company press release, company directory, social networking sites)

In one embodiment of the method illustrated in FIG. 9, the system will access 3201 and store in a computer-readable memory trainee information about each user to whom the mock malicious message should be directed. The information will typically include the contact information necessary for the mock malicious message to be delivered to the target user(s). It may also include additional information that may be used to customize and increase the credibility of the mock malicious message such as trainee's name, department, role in an organization, country, language spoken at work, etc. The system may deploy a transmission 3203 that includes the mock malicious message. The message may be delivered via, for example, an SMS messaging service, which may also include whitelisting the number from which the mock message originates with relevant cell phone operators, an instant messaging application, some other messaging application (e.g. iMessage, WhatsApp) or in-channel messaging application (e.g. Skype, Facebook), a private messaging application, an automated phone call service, a VOIP communication service, or some other messaging service. Optionally, the mock malicious message attack may include instructions and/or links that prompt the trainee to provide sensitive information, including possibly identifying information, such as a password, a social security number, a credit card number. Identifying information can also be used to determine whether the response recorded to the mock attack originates from a trainee who is known to the system (e.g. a mock malicious phone call delivered to someone's home could possibly be answered by a family member of the trainee's). Depending on who responds to or takes action following exposure to the mock malicious message (e.g. depending on whether it is a registered trainee or not), the service may also deploy a follow-up mock malicious attack (e.g. prompting the user to provide additional sensitive information or initiate some other potentially sensitive activity).

When a user performs an action in response to the mock malicious message (such as by providing a reply to the message or clicking a hyperlink in the message), the system may detect the action 3205 and determine 3207 whether the action originated from a known trainee. It may do this by comparing identifying information provided as part of the user's action to identifying information about known trainees and determine if a match occurs. In an embodiment where the message is based on automated call functionality, the system may use voice recognition technology to determine whether the voice of the person who answers the call matches that of a known trainee. Optionally, the service may not require or retrieve personally identifiable information and may instead rely solely on the device ID to determine whether the device is a registered device that is known to be used by a known trainee. If the request did not originate from a known trainee or device, the system may not need to take any particular application for that user 3211. If the request did originate with a known trainee, the system may capture and record identifying information about the trainee as well as the trainee's response action 3209, determine a training intervention that is appropriate for the trainee based on the trainee's action (using methods such as those described earlier in this document) 3213, and deliver the training intervention to the trainee 3215. The training intervention may be delivered to the trainee via another message in response to the user's reply or through some other channel. Or, the service may provide the trainee with instructions indicating how the trainee should receive the training intervention. Optionally, the training action may only be delivered if the trainee responds to at least a threshold number of training interventions, or only if the user takes certain predetermined actions in response to the training intervention. When a reply to a mock malicious message is identified as not originating from a known, registered user, the system may just delete the reply and not keep any information associated with that reply.

Figure 10:
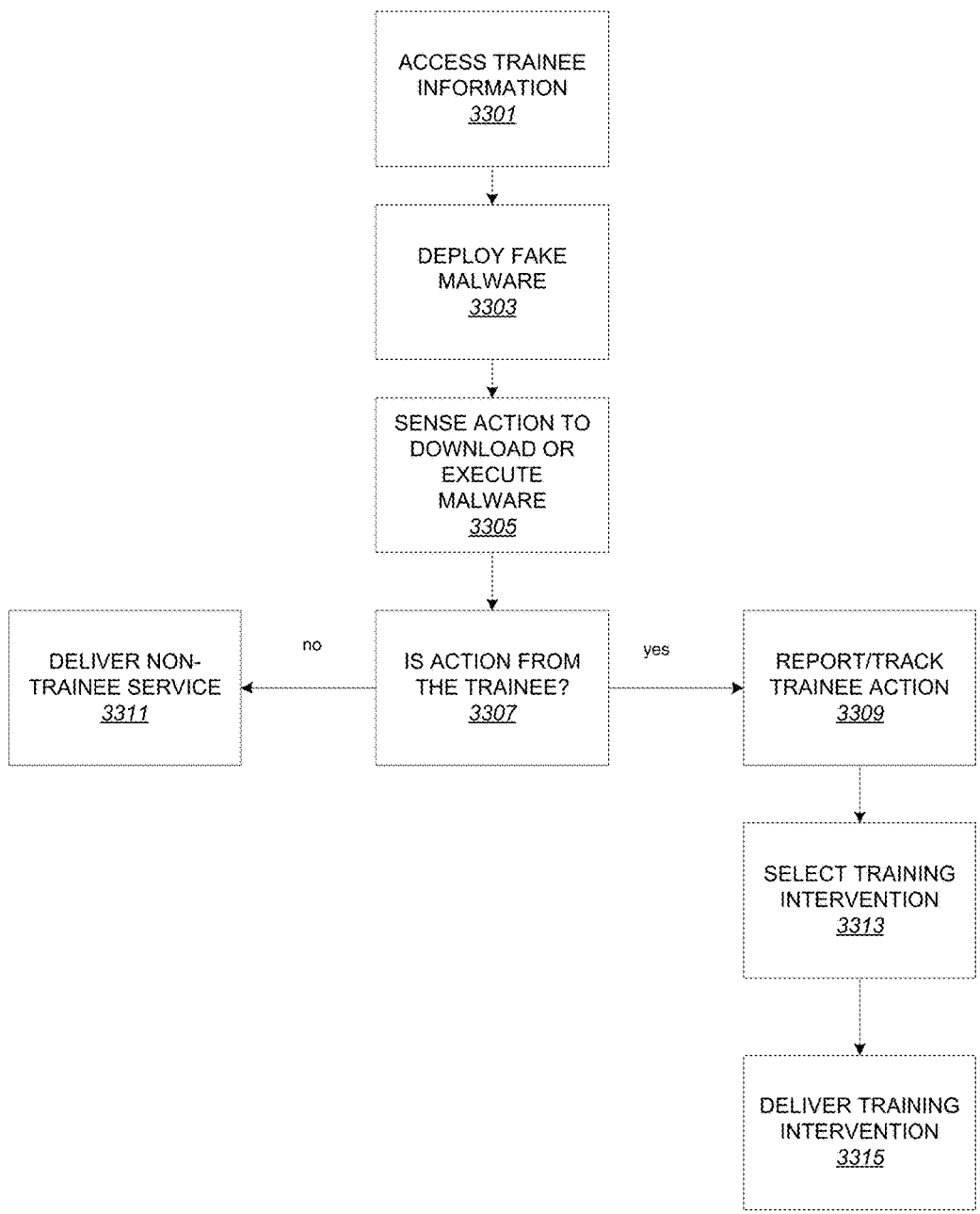
FIG. 10 is a flow diagram of an alternate method of luring a trainee to install fake malicious malware and delivering a training intervention to the trainee after the user takes the bait of the lure.

FIG. 10 is a flow diagram illustrating a method by which the system may deploy mock malicious software (malware) intended to (i) estimate a user's susceptibility to different threat scenarios involving the delivery of malware, and, if necessary, (ii) deliver training interventions relevant to those threat scenarios. In this embodiment, the mock malware may be delivered, for example, on a mock malicious memory device such as a USB memory device, via a file transfer site, via a mock app store, or another service, location, or device that can be used to create a mock attack situation that captures key elements of a corresponding threat scenario involving the download and execution of malware. The system may detect a user action such as connecting the memory device to his or her computing device, opening a mock malicious file stored on the memory device, downloading the software from a website, clicking a link to download the software, and the like. When the user downloads and/or causes the mock malware to execute, the mock malware may prompt the user to perform a particular action, such as provide a PIN number, password or personally identifiable information such as a Social Security number. The descriptive information about the mock malware may include descriptive information intended to lure the user to download the malware. This may include descriptive information (e.g. text or images intended to sway the user, logos associated with organizations the user is likely to trust, fake user reviews praising the software, particularly low price such as a free version of a popular software, promotion with a cutoff date, sweepstakes, fake recommendations from users or organizations the trainee is likely to trust, messages intended to scare the user to install the malware such as messages used to prompt users to install fake anti-virus software). This descriptive information may be customized using information about the trainees, whether individual trainees, or groups of trainees that is available to the system and that an attacker might realistically be able to obtain (e.g. information available in public records, information available on social networking sites, information available in press releases, etc.)

In the method of FIG. 10, the system will access 3301 and store in a computer-readable memory trainee information about each user to whom the mock malware may be directed. The information may include one or more unique device identifiers to recognize whether the mock malware is installed on a known device or not. It may include contact information (e.g. phone number, social networking handle, video conferencing service ID, email address) to send users messages intended to lure them into downloading the mock malware (e.g. messages containing links to a mock app store, a mock malicious app download link, a mock malicious URL where a user will be prompted to download mock malicious anti-virus software or to download and install a software patch to an application or operating system). It may contain information about locations in whose vicinity the user is likely to come (e.g. to determine where to drop off mock malicious USB memory devices with mock malware, or to determine where to place posters with QR Codes directing users to mock malicious app download links). More generally, the information may also include information that can be used to customize the mock malware attack such as information that can be used to increase the credibility or appeal of the mock malware attack. The system may deploy the mock malware 3303 on memory devices, file transfer sites, mock app stores or actual app stores, mock malicious URLs, actual sites where users share software (e.g. software utility download sites). The mock malware may also be included in online ads or included in consumer devices that target employees are likely to purchase (e.g. through a mock online store whose URL is distributed among employees of a company). When the trainee installs the mock malware, the mock malware may also deploy a command to the user's device that causes the user's device to take actions similar to those an attacker might launch to further deploy a threat scenario for which the mock malware is intended to evaluate user susceptibility. This could include prompting the user to provide sensitive information, collecting sensitive information (e.g. mock spyware program recording the phone numbers a user calls, the emails the user types, the SMS messages a user receives, the locations where the user goes). This information could in turn be used to further customize training interventions delivered to a user (e.g. incorporating the phone numbers the user called over the course of a day or the location where he has been to show him how spyware could easily collect and transmit this information to an attacker).

When a user requests to install the malware (or when the user just downloads and/or installs the malware), the system may detect the user's action 3305 (such as by receiving the request or sensing the download) and determine 3307 whether the action originated from a known trainee. It may do this by comparing the received device ID or user data to the known trainee information and determine if a match occurs. Optionally, the service may not require or retrieve personally identifiable information and may instead rely solely on the device ID to determine whether the device is a registered device that is known to be used by a known trainee. In some embodiments, the personally identifiable information may be returned to the service in a confirmation indicating that the fake malware has been installed. If the action did not originate from a known trainee or device, then the system may not need to take any particular action for that user, or it may provide the user with an error message to let the user know that the downloaded software does not work; or it may provide the user with a functional version of the software the user wanted to download; or it may provide the user with a generic training message intended to inform the user about the general risks associated with the threat scenario which the mock attack is intended to capture. These and other related options are intended to be captured by step 3311 ("deliver non-trainee service"), including the option of just doing nothing. If the request did originate with a known trainee, the system may capture and record identifying information about the trainee as well as the trainee's response action 3309, determine a training intervention that is appropriate for the trainee based on the trainee's action (using methods such as those described earlier in this document) 3313, and deliver the training intervention to the trainee 3315. The training intervention may be delivered to the trainee via the mock malware itself or through an entirely different channel (e.g. email, phone call, SMS). Or, the mock malware may provide the trainee with instructions indicating how the trainee should receive the training intervention. Optionally, the training action may only be delivered if the trainee responds to at least a threshold number of training interventions, or only if the user takes certain predetermined actions in response to the training intervention. As detailed earlier, more complex logic and more sophisticated training needs models may be used to drive this process. As in FIGS. 7 and 8, the sequence of steps shown in the flow diagram of FIG. 10 may vary. For example, FIG. 10 shows step 3301 as taking place before step 3303. In some embodiments however, this step may take place after step 3305 and before step 3307. For instance, mock malware could be distributed via a mock app store. When downloaded or launched, the mock malicious app might look for a unique device ID and return the ID to enable the system to determine whether the download took place on a known device, thereby enabling the system to determine whether the action (or request for the mock malware) originated from a known trainee 3307.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

The invention claimed is:

1. A computer-implemented method for assessing cybersecurity training needs, comprising:
   by a sensor, sensing data corresponding to at least one action performed by a user with respect to a user computing device; and
   by a computer system comprising a processor, executing computer-readable programming instructions that cause the computer system to:
   access a data storage device that stores a training needs model,
   map the sensed data to the training needs model to determine whether the sensed data corresponds to a pattern associated with a threat scenario in the training needs model,
   in response to determining that the sensed data corresponds to a pattern associated with a threat scenario in the training needs model, identify a cybersecurity threat scenario for which the user is at risk, and
   use the training needs model to estimate susceptibility of the user to the cybersecurity threat scenario for which the user is at risk.

2. The method of claim 1 further comprising, by the computer system, executing additional programming instructions that cause the system to:
   access a collection of available cybersecurity training actions;
   based on the sensed data, the training needs model and the cybersecurity threat scenario, select a cybersecurity training action from the collection of available cybersecurity training actions; and
   cause the selected cybersecurity training action to be delivered to the user.

3. The method of claim 1, further comprising:
   directing a mock attack to the user computing device; and
   wherein the action comprises a response to the mock attack.

4. The method of claim 1, wherein mapping the sensed data to the training needs model to determine whether the sensed data corresponds to a pattern associated with a threat scenario in the training needs model comprises determining whether the user repeated a particular action at least a threshold number of times.

5. The method of claim 1, further comprising:
   determining that the pattern or the estimated susceptibility satisfies a rule to implement a training intervention;
   selecting a cybersecurity training action that corresponds to one or more actions of the user, or to the user computing device; and
   causing the user computing device to present the cybersecurity training action to the user.

6. The method of claim 1, wherein:
the sensed data comprises data corresponding to the user opening an attachment to a message;
the given pattern comprises equaling or exceeding a frequency threshold; and
the threat scenario comprises opening a malicious attachment or falling for a phishing email.

7. The method of claim 1, wherein:
the sensed data comprises data corresponding to the user requesting a blacklisted website;
the given pattern comprises equaling or exceeding a frequency threshold; and
the threat scenario comprises falling for a phishing email.

8. The method of claim 1, wherein:
the sensed data comprises data corresponding to the user posting on or spending time accessing a social networking site;
the given pattern comprises equaling or exceeding a frequency threshold; and
the threat scenario comprises disclosing sensitive information.

9. The method of claim 1, wherein:
the sensed data comprises data corresponding to the user inserting a USB into the user computing device;
the given pattern comprises equaling or exceeding a frequency threshold; and
the threat scenario comprises downloading malware from a malicious USB device.

10. The method of claim 1, wherein:
the sensed data comprises data corresponding to the user downloading an app;
the given pattern comprises equaling or exceeding a frequency threshold; and
the threat scenario comprises downloading a malicious app.

11. The method of claim 1, wherein:
the sensed data comprises data corresponding to the user connecting to an unsecured wireless access point;
the given pattern comprises equaling or exceeding a frequency threshold; and
the threat scenario comprises connecting to a rogue wireless service.

12. The method of claim 1, further comprising:
by a configuration sensor, detecting one or more hardware or software settings of the user computing device; and
also using the one or more settings to identify the cybersecurity threat scenario for which the user is at risk.

13. The method of claim 1, wherein:
the sensed data comprises data corresponding to the user connecting a memory device to the user computing device, opening a mock malicious file stored on a memory device, or downloading software; and
the threat scenario involves installing malware.

14. The method of claim 1, wherein the sensed data comprises at least one of the following: perimeter security data, Mobile Device Management (MDM) data or Data Leakage Prevention (DLP) data.

15. The method of claim 1, wherein:
the sensed data comprises or more of the following additional sensed data types:
files in a directory of downloaded files,
location data,
data from a password vulnerability sensor indicating how often the user changes a password or the strength of the password,
data from a social networking sensor that crawls social networking sites and estimates a level of social networking activities in which the user engages,
data from a dangerous program sensor that inspects the code of software on one or more electronic devices operated by the user,
incoming and outgoing data flows from the user computing device, or
behavioral characteristics associated with software running on the user computing device; and
the method also comprises mapping the one or more additional sensed data types to the training needs model when determining whether the sensed data corresponds to a pattern associated with a threat scenario in the training needs model.

16. A system for assessing cybersecurity training needs, comprising:
a sensor that is configured to sense data corresponding to at least one action performed by a user with respect to a user computing device;
a data storage device that stores a training needs model;
a processor; and
a computer-readable non-transitory memory containing programming instructions that are configured to cause the processor to:
map the sensed data to the training needs model to determine whether the sensed data corresponds to a pattern associated with a threat scenario in the training needs model,
in response to determining that the sensed data corresponds to a pattern associated with a threat scenario in the training needs model, identify a cybersecurity threat scenario for which the user is at risk, and
use the training needs model to estimate susceptibility of the user to the cybersecurity threat scenario for which the user is at risk.

17. The system of claim 16 further comprising:
a memory containing a collection of available cybersecurity training actions; and
additional programming instructions that are configured cause the processor to:
access the collection of available cybersecurity training actions,
based on the sensed data, the training needs model and the cybersecurity threat scenario, select a training action from the collection of available cybersecurity training actions, and
cause the selected cybersecurity training action to be delivered to the user.

18. The system of claim 16, further comprising:
additional programming instructions that are configured cause the processor to direct a mock attack to the user computing device, and
wherein the action comprises a response to the mock attack.

19. The system of claim 16, wherein the instructions to map the sensed data to the training needs model to determine whether the sensed data corresponds to a pattern associated with a threat scenario in the training needs model comprise instructions to determine whether the user repeated a particular action at least a threshold number of times.

20. The system of claim 16, further comprising additional programming instructions that are configured cause the processor to:
determine that the pattern or the estimated susceptibility satisfies a rule to implement a training intervention;

select a cybersecurity training action that corresponds to one or more actions of the user, or to the user computing device; and cause the user computing device to present the cybersecurity training action to the user.

21. The system of claim 16, wherein:
the sensed data comprises data corresponding to the user using the user computing device to open an attachment to a message;
the given pattern comprises equaling or exceeding a frequency threshold; and
the threat scenario comprises opening a malicious attachment or falling for a phishing email.

22. The system of claim 16, wherein:
the sensed data comprises data corresponding to the user using the user computing device to request a blacklisted website;
the given pattern comprises equaling or exceeding a frequency threshold; and
the threat scenario comprises falling for a phishing email.

23. The system of claim 16, wherein:
the sensed data comprises data corresponding to the user using the user computing device to post on or spend time accessing a social networking site;
the given pattern comprises equaling or exceeding a frequency threshold; and
the threat scenario comprises disclosing sensitive information.

24. The system of claim 16, wherein:
the sensed data comprises data corresponding to the user inserting a USB into the user computing device;
the given pattern comprises equaling or exceeding a frequency threshold; and
the threat scenario comprises downloading malware from a malicious USB device.

25. The system of claim 16, wherein:
the sensed data comprises data corresponding to the user downloading an app to the user computing device;
the given pattern comprises equaling or exceeding a frequency threshold; and
the threat scenario comprises downloading a malicious app.

26. The system of claim 16, wherein:
the sensed data comprises data corresponding to the user connecting the user computing device to an unsecured wireless access point;
the given pattern comprises equaling or exceeding a frequency threshold; and
the threat scenario comprises connecting to a rogue wireless service.

27. The system of claim 16, further comprising:
a configuration sensor configured to detect one or more hardware or software settings of the user computing device; and
additional programming instructions configured to also use the one or more settings when identifying the cybersecurity threat scenario for which the user is at risk.

28. The system of claim 16, wherein:
the sensed data comprises data corresponding to the user connecting a memory device to the user computing device, opening a mock malicious file stored on a memory device, or downloading software to the user computing device; and
the threat scenario involves delivery of malware.

29. The system of claim 16, wherein the sensor comprises:
a firewall system;
a Mobile Device Management (MDM) client; or
a Data Leakage Prevention (DLP) application.

30. The system of claim 16, wherein:
the sensed data comprises or more of the following additional sensed data types:
files in a directory of downloaded files of the user computing device,
location data for the user computing device,
data from a password vulnerability sensor indicating how often the user changes a password for the user computing device or the strength of the password,
data from a social networking sensor that crawls social networking sites and estimates a level of social networking activities in which the user engages,
data from a dangerous program sensor that inspects the code of software on the user computing device,
incoming and outgoing data flows from the user computing device, or
behavioral characteristics associated with software running on the user computing device; and
the method also comprises mapping the one or more additional sensed data types to the training needs model when determining whether the sensed data corresponds to a pattern associated with a threat scenario in the training needs model.

* * * * *